US007849009B2

(12) United States Patent
Compiano et al.

(10) Patent No.: US 7,849,009 B2
(45) Date of Patent: Dec. 7, 2010

(54) METHODS AND APPARATUS FOR MAPPING SOURCES AND USES OF CONSUMER FUNDS

(75) Inventors: Craig Compiano, Oakland, CA (US); Michael W. Rogers, Berkeley, CA (US); William R. Grant, Danville, CA (US)

(73) Assignee: The Western Union Company, Englewood, CO (US)

( * ) Notice: Subject to any disclaimer, the term of this patent is extended or adjusted under 35 U.S.C. 154(b) by 1883 days.

(21) Appl. No.: 10/336,671

(22) Filed: Jan. 2, 2003
(Under 37 CFR 1.47)

(65) Prior Publication Data
US 2004/0015438 A1    Jan. 22, 2004

Related U.S. Application Data

(63) Continuation-in-part of application No. 10/168,871, filed as application No. PCT/US00/33750 on Dec. 13, 2000, now abandoned.

(60) Provisional application No. 60/173,691, filed on Dec. 29, 1999.

(51) Int. Cl.
*G06Q 40/00* (2006.01)
(52) U.S. Cl. .......................... 705/40; 705/35
(58) Field of Classification Search .................. 705/35, 705/40
See application file for complete search history.

(56) References Cited

U.S. PATENT DOCUMENTS

| 4,270,042 | A | * | 5/1981 | Case | 235/379 |
|---|---|---|---|---|---|
| 4,727,243 | A | * | 2/1988 | Savar | 705/17 |
| 5,214,579 | A | | 5/1993 | Wolfberg et al. | |
| 5,557,518 | A | * | 9/1996 | Rosen | 705/69 |
| 5,649,117 | A | * | 7/1997 | Landry | 705/40 |
| 5,684,965 | A | * | 11/1997 | Pickering | 705/34 |
| 5,689,649 | A | | 11/1997 | Altman et al. | |

(Continued)

OTHER PUBLICATIONS

Joinson, Carla, Pay attention to pay cycles. HRMagazine. Alexandria: Nov. 1998, Iss. 12; p. 1-4.*

(Continued)

*Primary Examiner*—Jennifer Liversedge
*Assistant Examiner*—Jamie H Swartz
(74) *Attorney, Agent, or Firm*—Townsend and Townsend and Crew LLP

(57) ABSTRACT

The present invention provides exemplary bill paying service methods and systems. One such bill paying service method (1000) includes enrolling a subscriber (Step 1010) who is a debtor to a first creditor and who has authorized debits to be taken from a designated account. The designated account is adapted to periodically receive a payroll deposit on a first regular schedule that is over time in excess of a minimum payment on a first debt owed by the debtor to the first creditor. The designated account is periodically debited, and any funds obtained are used to credit a custody account (Step 1012). The first creditor is paid (Step 1016), on behalf of the debtor and from the custody account, on a second regular schedule that differs from the first regular schedule. Paying the first creditor occurs in an amount calculated for an accelerated repayment of the first debt (Step 1014). Such excess is used to accelerate the repayment of various loans and debts according to what particular application at that time will have the greatest long-term beneficial effect.

17 Claims, 13 Drawing Sheets

U.S. PATENT DOCUMENTS

| | | | |
|---|---|---|---|
| 5,699,528 A * | 12/1997 | Hogan | 705/40 |
| 5,875,435 A * | 2/1999 | Brown | 705/30 |
| 5,920,848 A | 7/1999 | Schutzer et al. | |
| 5,946,669 A * | 8/1999 | Polk | 705/40 |
| 5,987,436 A | 11/1999 | Halbrook | |
| 6,006,207 A * | 12/1999 | Mumick et al. | 705/38 |
| 6,032,133 A * | 2/2000 | Hilt et al. | 705/40 |
| 6,041,315 A * | 3/2000 | Pollin | 705/45 |
| 6,185,543 B1 * | 2/2001 | Galperin et al. | 705/38 |
| 6,223,168 B1 * | 4/2001 | McGurl et al. | 705/40 |
| 6,253,203 B1 * | 6/2001 | O'Flaherty et al. | 707/9 |
| 6,269,347 B1 | 7/2001 | Berger | |
| 6,304,860 B1 | 10/2001 | Martin, Jr. et al. | |
| 6,401,079 B1 | 6/2002 | Kahn et al. | |
| 6,430,542 B1 * | 8/2002 | Moran | 705/36 R |
| 6,493,680 B2 * | 12/2002 | Logan et al. | 705/34 |
| 6,606,606 B2 | 8/2003 | Starr | |
| 6,850,996 B2 * | 2/2005 | Wagner | 710/33 |
| 6,904,412 B1 * | 6/2005 | Broadbent et al. | 705/38 |
| 7,089,208 B1 * | 8/2006 | Levchin et al. | 705/39 |
| 2001/0013017 A1 * | 8/2001 | Berger | 705/38 |
| 2002/0038289 A1 * | 3/2002 | Lawlor et al. | 705/42 |
| 2002/0095651 A1 * | 7/2002 | Kumar et al. | 717/104 |
| 2002/0123949 A1 * | 9/2002 | VanLeeuwen | 705/35 |
| 2002/0156733 A1 * | 10/2002 | Shimada et al. | 705/42 |
| 2003/0074311 A1 * | 4/2003 | Saylors et al. | 705/39 |
| 2004/0078318 A1 * | 4/2004 | Miller | 705/38 |
| 2006/0271465 A1 * | 11/2006 | McNamar et al. | 705/35 |
| 2008/0021802 A1 | 1/2008 | Pendleton | |

OTHER PUBLICATIONS

Lazarony Lucy, Paying off high credit card debit- pick an approach and do it, bankrate.com, Sep. 21, 1999. p. 1-3.*

Guttentag, Jack. Your mortgage; there's no magic needed to repay home loan early. Los Angeles Times. Jul. 5, 1998. p. 1-2.*

Patchett, Sharon. There are many ways to pay off credit debt find one that suits you. The Post-Standard. Oct. 21, 1996. p. 1-2.*

Palestrant, Vita. Cutting corners; Banking Sydney Morning Herald. Feb. 19, 1997. p. 1-4.*

Meyer, Gene. Plan payments to save on interest. Kansas City Star. May 7, 1995. p. 1-2.*

Guttentag, Jack. Your mortgage; there's no magic needed to repay home loan early. Los Angeles Times. Jul. 5, 1998. p. 1-2.*

Meyer, Gene. Plan payments to save on interest. Kansas City Star. May 7, 1995. p. 1-2.*

* cited by examiner

METHODS AND APPARATUS FOR MAPPING SOURCES AND USES OF CONSUMER FUNDS

CROSS-REFERENCES TO RELATED APPLICATIONS

This application is a continuation-in-part of U.S. patent application Ser. No. 10/168,871, entitled *Method and Apparatus for Mapping Sources and Uses of Consumer Funds*, filed Jun. 24, 2002; which is based on International Application Number PCT/US00/33750, entitled *Method and Apparatus for Making Sources and Uses of Consumer Funds*, filed Dec. 13, 2000; which claims priority from U.S. Provisional Patent Application Ser. No. 60/173,691, filed Dec. 29, 1999.

BACKGROUND OF THE INVENTION

The present invention relates to plans for repaying loans and other installment debts, such as mortgages, on accelerated schedules. More particularly, the present invention is directed to computer-implemented systems and methods that organize, forward, and report the application of many individual consumer payments to their corresponding lenders and creditors with the objective of saving the consumer money over a standard installment repayment history.

In general, a consumer borrows money from a lender, typically to make a purchase of a home, automobile, or other large item of real or personal property. The borrowed monies are paid back to the lender, or a designated third party, over a period of time or term. Additionally, the lender charges interest on the unpaid loan principal at an agreed interest rate. Each installment payment, usually made once a month, is typically applied first against the interest earned, and then goes towards reducing the outstanding unpaid principal. For each payment, particularly early in the repayment schedule, the amount that goes towards reducing the principal can be relatively small (e.g., 10% or less).

If the borrower can make payments more frequently than once a month, or pay more than the prescribed monthly payment, the loan principal will be reduced faster. As a result, the amount of interest paid by the consumer also is reduced. For example, if the borrower pays one-half the monthly payment amount every two weeks, the borrower will have made twenty-six (26) payments in one year, or the equivalent of thirteen (13) monthly payments. This payment scheme may reduce the term of a 30-year mortgage by several years, with thousands of dollars potentially being saved over the standard monthly payment schedule.

Commerce has always depended on the flow of value, i.e., companies and individuals paying what they owe and collecting what they've earned. The conduit for the flow of value is the payments system which has progressed from barter, to coins, to paper currencies, to checks, and lately to electronic payments. In decades past, cash and checks were the preferred payment calculators for consumers and businesses. Today, businesses, government agencies, and consumers feel the burden of paper overload as more than sixty-three billion checks are processed every year. Each check must be written or printed, signed and mailed, and then retrieved, reconciled, and stored. With increasing incidents of check fraud and a strong emphasis on privacy, traditional check-issuers are demanding more secure and confidential alternatives provided by electronic payments.

Direct deposit is the automatic deposit of all or part of employees' pay, retirees' pension and annuities, and other business deposits to consumers' checking, savings, and/or brokerage accounts. Instead of printing checks, the employer or benefactor (originator) supplies a computer file containing a record for each participating employee/retiree/consumer to the businesses financial institution (the ODFI). The ODFI assures correct formatting and transmits the file to the automatic clearing house (ACH) operator for delivery to the employees'/retirees'/consumers' (receivers') depository accounts at their financial institutions (RDFI's).

In the case of direct deposit of payroll, the employer regularly provides the employee with information regarding gross pay, payroll deductions, tax withholding, net pay, and other appropriate details. Similarly, businesses supply other appropriate data to pensioners, annuitants, and consumers regarding the credits to their depository accounts. Direct payment and home banking/bill payment services save consumers time and money by eliminating checks, check handling, and postage. With direct payment, consumers can preauthorize electronic debits to their depository accounts for types of recurring bill payments such as insurance premiums, utility bills, all types of loan payments, mortgages, club memberships, subscriptions, and charitable contributions. To initiate direct payment, consumers must provide a written authorization to their participating billing companies, clubs, charities, etc. Authorizations may be cancelled at the discretion of the consumer according to the procedures outlined in the authorization. Cancellation of direct payment has no effect on the consumers' financial obligation to the billing company. With appropriate authorization, the billing company originates a computer file containing payment information. The company's financial institution transmits the debit through the ACH-network to the consumer's depository account.

When consumers choose to participate in conventional home banking/bill payment services, they can initiate their bill payments by telephone, computer, or other calculators. The consumer's service provider initiates ACH debits from the consumer's bank account and ACH credits to the consumer's billing account for the authorized payment. Home banking/bill payment services are offered by various financial institutions and other private service providers throughout the United States. Direct payment and home banking services provide benefits to both companies and consumers. Companies reduce expenses associated with check processing and improve cash flows by reducing delinquencies and late billing procedures. Consumers reduce check and postage costs and save the time of manually preparing and mailing checks. In addition, consumers can reduce late fees, forget about payment deadlines, and make their account reconciliation process simpler. Consumers never relinquish control of their accounts. Direct payments and home banking/bill payment services may be terminated or modified at any time according to procedures outlined in the authorization agreement.

Electronic commerce can incorporate all aspects of the ordering, inventory, and payments processes of businesses. Companies may use electronic data interchange (EDI) to place orders; to update, control, and reorder inventories; to transmit billing statements; and to collect or make payments. The ACH-network is an efficient electronic payment alternative to checks and wire transfers to complement electronic commerce. Electronic business payments may be ACH debits or ACH credits depending on the needs of and the agreements among trading partners. The ACH-network provides an electronic payments calculators for financial EDI, Internet payments, corporate trading partner exchanges, corporate cash management, and other business-to-business transactions such as transmission of insurance and healthcare information and payments.

Financial EDI is the electronic movement of payments and payment-related information in standard formats through the banking system. Businesses of all sizes; state, local, and federal government agencies; and financial institutions are incorporating financial EDI into their payments practices to minimize the flow of paper, to reduce administrative costs, and to improve efficiencies. Businesses use the ACH-network to pay or to collect from corporate trading partners. The transaction sets of the ACH-network provide varying levels of payment transfers from the simplest to the most complex, including invoice numbers, discount, adjustment, and other remittance information.

Since the 1990s, the Internet has become an increasingly important tool for business-to-business communications. Companies use the Internet to place orders, update inventories, and authorize payments. The ACH-network provides an efficient payments calculator to settle transactions initiated on the Internet. Good corporate cash management techniques allow businesses to accelerate cash in-flows, manage account balances to reduce borrowing needs, improve earnings potential of operating capital, and precisely control cash disbursements. The ACH-network allows companies to move money between branches or offices quickly and reliably based on operating needs. Companies with geographically dispersed offices can use the ACH-network to draw funds into centralized accounts from widely-scattered financial institutions. Similarly, funds can be disbursed to remote operations as needed. The ACH-network is an efficient calculator to shift balances to and from centralized concentration accounts to effectively administer corporate operations.

Notwithstanding the above benefits, improvements from both a consumer perspective and a service provider perspective are desired. For example, prior attempts to move money for customers have been limited to single transactions, or single subscriptions having a single balance and/or served from a single custody account. It would be desirable to provide more flexibility for consumers to service multiple transactions or subscriptions, and to provide a logical grouping of disbursements, as well as to provide other benefits.

BRIEF SUMMARY OF THE INVENTION

The present invention includes bill-paying systems and methods, some of which make use of a customer deposit account that receives periodic payroll deposits of an individual or a couple ("Subscriber"). A bill-paying service enrolls the individual or couple for a fee, and is authorized to transfer money from the deposit account to the accounts of various creditors. An originating depository financial institution (ODFI), such as a bank, actually handles the transfers of money, and such transfers are preferably done electronically. The automated clearing house (ACH) network supports such electronic money transfers. The various bills and debts of the individual or couple come due at times that may be asynchronous to their income structure. In some embodiments, the bill-paying service is authorized to debit the deposit account for more than the basic minimums due all the creditors each month. Such excess is used to accelerate the repayment of various loans and debts according to what particular application at that time will have the greatest long-term benefit.

Some embodiments of the present invention include one or more of the following features:

1. Associating the subscriber with multiple transactions involving the movement of money;

2. Providing a single subscription transaction table which contains data for moving money for multiple accounts or transactions;

3. Logically grouping disbursements for a given instrument so that a subscriber can have one physical loan with multiple recurring payment records;

4. Providing a trust finder function to join across multiple tables for trust arrangement to map money movement; and 5. Providing a campaign product for managing money based upon product type and destination of funds.

The present invention provides exemplary bill paying service methods. In one particular embodiment, a bill paying service method includes enrolling a subscriber who is a debtor to a first creditor and who has authorized debits to be taken from a designated account. The designated account is adapted to periodically receive a payroll deposit on a first regular schedule that is over time in excess of a minimum payment on a first debt owed by the debtor to the first creditor. The method includes periodically debiting the designated account and using any funds obtained to credit a custody account. The first creditor is paid, on behalf of the debtor and from the custody account, on a second regular schedule that differs from the first regular schedule. Paying the first creditor occurs in an amount calculated for an accelerated repayment of the first debt.

In this manner, the first debt is repaid in an accelerated fashion to, in some cases, reduce the amount of interest owed to the first creditor. Alternatively, the debt(s) may be non-interest bearing. Further, payment to the first creditor is not necessarily tied to the subscriber's payroll deposit schedule, but can be independent therefrom. In other aspects, however, periodically debiting the designated account coincides with the first regular schedule. In one aspect, the difference between the first and second regular schedules provides at least partially for the accelerated repayment.

In one aspect, the method includes charging a service fee to the subscriber by debiting the custody account. In some embodiments, a series of transmissions of ACH-files to an originating depository financial institution (ODFI) are used to implement the funds transfers. The ODFI has access to the designated account and the custody account, and can forward funds to the first creditor.

Some embodiments of the present invention include reporting functions as well. For example, in one aspect, the method includes reporting to the subscriber a savings total associated with the accelerated repayment. Alternatively or in addition, an adjusted credit term on the first debt is reported to the subscriber.

In another aspect, the designated account is adapted to periodically receive a second payroll deposit on a third regular schedule. This may be useful, for example, if the subscriber has two different jobs, each providing payroll direct deposit, or if the subscriber is a dual income couple. Further, in one embodiment, the designated account is adapted to periodically receive a credit on a first credit schedule. The credit may be a payroll deposit, a government check (e.g., social security, disability, veterans benefits, and the like), a pension plan payment, a trust fund disbursement, and a wide-range of other payments that may, or may not, occur on regular time intervals.

In one embodiment, a bill paying service method further includes determining an amount of funds to be paid to a second creditor from the custody account to pay a second debt owed the second creditor by the debtor. The second creditor is subsequently paid. In some embodiments, payments made to the second creditor include a bill payment, a club membership payment, a loan payment, and the like.

In one aspect, an extra payment to be made to the first creditor is calculated. The extra payment provides at least a portion of the accelerated repayment of the first debt. In another aspect, debiting of the designated account occurs over a designated period of time in an amount that is at least as much as the sum of the first debt and the second debt. In this manner, the custody account maintains sufficient monies to repay the subscriber's debt(s), with one or more repayments provided on an accelerated schedule.

In one aspect, the method includes calculating using a campaign product tool to determine the amount of funds available for the paying the first creditor. In another aspect, a trust finder is used to determine a portion of the first calculated amount to be transferred to an escrow account. In some aspects, the first calculated amount is sufficient to provide the accelerated repayment, but does not deplete the funds in the custody account nor prevent the payment of the designated amount to the second creditor. It will be appreciated by those skilled in the art that methods of the present invention are flexible enough to accommodate payments to more than two creditors as well.

The present invention also provides exemplary bill paying systems. In one such embodiment, the bill paying system includes a mechanism adapted to be coupled to a designated deposit account (DDA) belonging to a debtor. The DDA is periodically credited with a first credit on a first regular credit schedule. The mechanism is further coupled to a custody account adapted to receive funds from the DDA on a first funds transfer schedule, and coupled to a first creditor account belonging to a first creditor of the debtor. The mechanism is adapted for determining an amount of funds to be transferred from the custody account to the first creditor account to provide an accelerated repayment of a first debt owed the first creditor by the debtor. In alternative embodiments, the mechanism is adapted to provide one or more of the methods according to the present invention. The mechanism may comprise hardware, software, or some combination thereof.

In one embodiment, the bill paying system includes a reporting mechanism adapted to report to the debtor the transfer of funds from the custody account to the first creditor account, and/or an adjusted credit term on the first debt.

In one aspect, the mechanism is coupled to an originating depository financial institution (ODFI), with the ODFI effectuating the transfer of funds between the DDA, the custody account and the accounts of one or more creditors.

In one aspect, the bill paying system includes a trust finder mechanism, and/or a campaign product tool. In another aspect, the mechanism is adapted to calculate an extra payment to be made to the first creditor after paying the second creditor, with the extra payment calculated to provide at least a portion of the accelerated repayment of the first debt.

The summary provides only a general outline of the embodiments according to the present invention. Many other objects, features and advantages of the present invention will become more fully apparent from the following detailed description, the appended claims and the accompanying drawings.

DETAILED DESCRIPTION OF THE INVENTION

Figure 1:
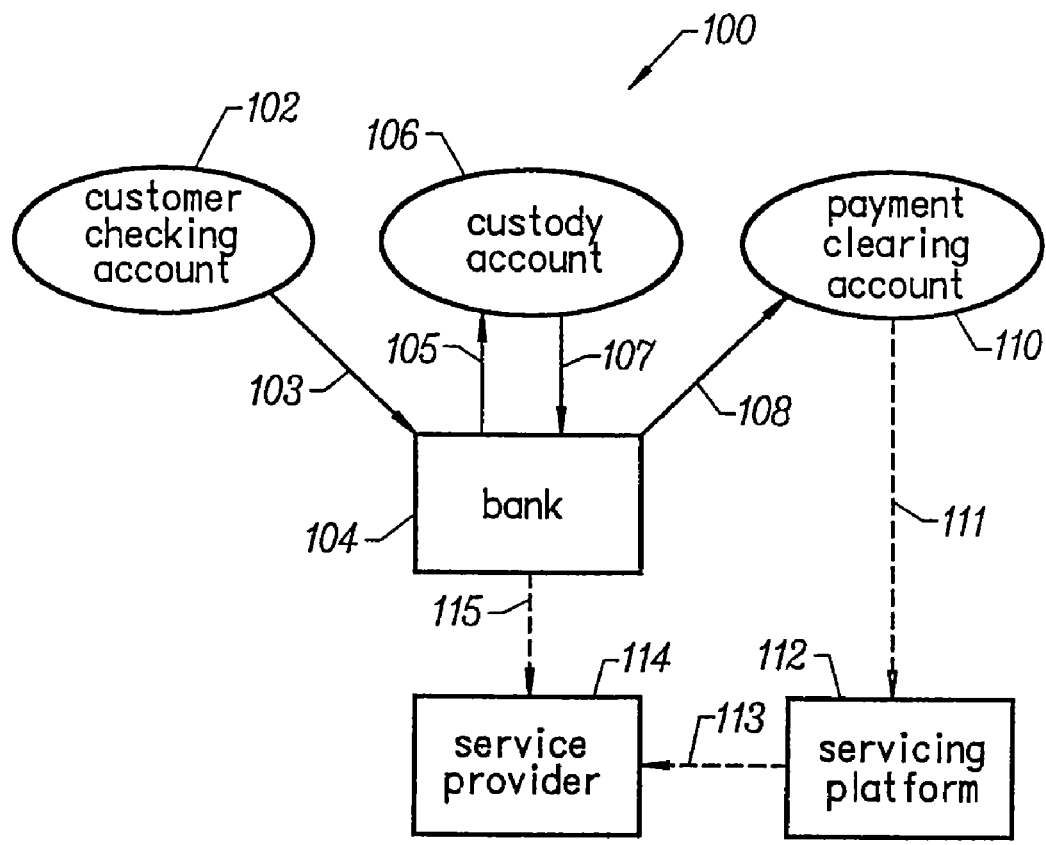
FIG. 1 is a functional block diagram of a loan servicing system.

FIG. 1 represents a loan servicing system, and is referred to herein by the general reference numeral 100. A customer checking account 102 sources a transfer of funds 103 to a bank 104. A credit 105 is made to a custody account 106 that acts like a buffer. Money is stockpiled in the custody account 106 from the customer checking account 102 in amounts and times that are dependent on a customer's ability to earn income. In effect, this is a front-end money-gathering subsystem. A series of partial payments are stored up over time in custody account 106.

A debit 107 is periodically made to issue a credit 108 to a payment clearing account 110. An advise 111 is returned to a servicing platform 112. A back-end mortgage servicing or legacy subsystem is provided for posting payments, segregating and remitting funds, calculating interest, mortgage servicing, car loan type processing, etc. In an early development prototype system, servicing platform 112 was provided by Computer Power, Inc., now a part of Alcatel. A communications link 113 allows a service provider 114 to direct the back-end mortgage servicing or legacy subsystem. Another communications channel 115 allows service provider 114 to direct the front-end money-gathering subsystem. Servicing platform 112 was initially provided with mortgage servicing software, but it was discovered that this could be greatly expanded to service more than just the mortgages of a consumer. Many or all of the installment accounts could be simultaneously managed for many hundreds of customers. It is also possible for billers to present bills for the customer to pay that are delivered to service provider 114, e.g., bills that require payment within ten days, or the like. Custody account 106 would then be used by servicing platform 112 to pay such "pay-on-demand" bills when previously authorized.

Figure 2:
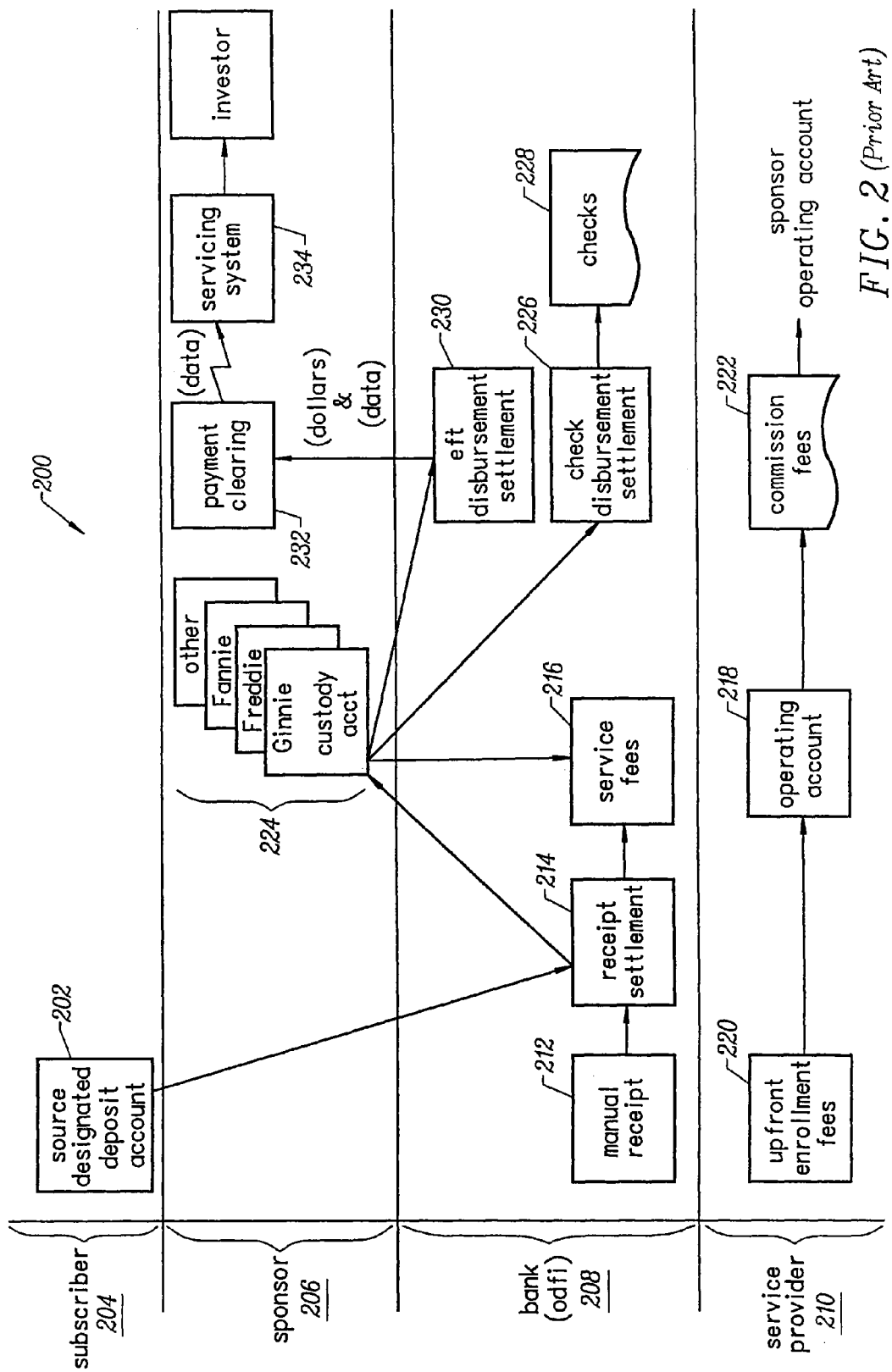
FIG. 2 is a functional block diagram of a money management system.

FIG. 2 represents a money management system that is referred to herein by the general reference numeral 200. A source designated deposit account (DDA) 202 belongs to a subscriber 204 and has money periodically deposited to it. For example, DDA 202 may be the joint account of a husband and wife where the husband gets paid by his employer every Friday and the wife by her employer every other Tuesday. Between them, the couple (subscriber 204) have various installment loans and credit card debts that need to be paid on or before certain days of the month and with minimum payments for some or all. For example, a monthly payment is due to a sponsor mortgage lender 206. An originating depository financial institution (ODFI) 208 (e.g., a bank) is authorized to debit DDA 202 at instructed times and amounts. The couple holding DDA 202 have authorized a payment service provider 210 to instruct that funds be withdrawn from this account to pay the various creditors on time and with at least the required minimum payments. A pre-arranged payment and deposit (PPD) in ACH-format is used by payment service provider 210. The particular income structure of subscriber 204 is preferably used to advantage by payment service provider 210 to make periodic payments on the installment loans and credit card debts. For such service, subscriber 204 will pay payment service provider 210 a fee 222. Fee 222 may be charged per use, per month, or the like.

Subscriber 204 often can benefit by paying more than the minimums due on each account, and/or by paying a monthly installment account in part more frequently than once a month. Subscriber 204 benefits by a more rapid decrease in the unpaid principal and therefore saves on the interest charges that accrue on that unpaid principal. At the same time, it is desired that there always be enough money on hand to pay each bill by its due date. So any acceleration of payments cannot leave the system 200 short of funds to pay any bill that normally comes due later in the month. Payment service provider 210 therefore is instructed which creditors are to be paid, the terms of the loans involved, the income structure of subscriber 204, and the total amounts authorized to be withdrawn at various times of the week, month, and year from DDA 202.

The movement of money in system 200 preferably uses the automated clearing house (ACH) network in the United States which is a central clearing facility that provides distribution and settlement of electronic financial transactions. ACH operators clear debits and credits electronically, rather than through the physical movement of checks. There are four ACH operators in the United States, the Federal Reserve System, Visanet ACH, New York ACH, and American ACH. The Federal Reserve System alone clears about eighty percent of all ACH transactions. Such ACH-network was formed in the early 1970's to provide an efficient alternative using electronic and telecommunications technology to replace paper check processing. The ACH system uses batch-processing, store and forward operations. ACH payments are not processed individually. Originating depository financial institutions (ODFI's) submit ACH payment files to the ACH operators. The ACH operators accumulate these files, sort them by destination, and transmit them to receiving depository financial institutions (RDFI's) for application to customers' accounts at predetermined times throughout the business day. The ACH system provides significant economies of scale compared to individual wire transfers, and is faster and more accurate than paper-check processing.

The ACH-network is a nationwide wholesale electronic payment and collection system now used by hundreds of thousands businesses and financial institutions. Technological advances implemented by the ACH operators allow transactions to arrive at their destinations in a matter of hours. Entries are settled quickly, most often within one business day of origination. The ACH-network delivers electronic payments quickly, safely, reliably, and conveniently to financial institutions for their customers.

The ACH-network is not used only for consumer transactions such as direct deposit and direct payment, nor only for business-to-business transactions known as financial EDI. The ACH-network is also the settlement calculator for home-banking payments, credit card clearings, electronic benefit transfers (EBT), point-of-sale (POS) and Internet purchases, electronic check transmissions, and even automated teller machine (ATM) transactions. The ACH system provides the basic infrastructure for a wide variety of electronic payment applications.

The national automated clearing house association (NACHA) is a nonprofit banking trade association that promulgates the rules and operating guidelines for electronic payments, such as direct deposit, direct payment (preauthorized debits), financial EDI, electronic benefits transfers, third-party bill payments, electronic checks, and Internet payments. NACHA represents thirty-five regional ACH associations which have a total of more than 13,000 financial institution members. NACHA provides educational payments conferences, as well as marketing collateral and technical publications. NACHA can be accessed through the Internet at www.nacha.org.

An "ACH originator" is a company or other business entity that creates entries for introduction into the ACH-network. For example, an employer produces credit entries to pay employees who have authorized direct deposit. A utility or other billing company produces debit entries from customers' financial institution accounts who have authorized direct payment for products and services. A business produces financial EDI transactions to pay or collect trading partner obligations. ACH receivers are consumers, customers, employees, and other businesses who have authorized electronic payments by direct deposit, direct payment, or financial EDI to be applied against their depository accounts. An originating depository financial institution (ODFI) typically initiates and warrants electronic payments through the ACH-network on behalf of its customers. A receiving depository financial institution (RDFI) provides depository account services to consumers, employees, and businesses and accepts electronic payments to those accounts. The ACH-network transfers payments and related data through computer and high-speed communications technology, e.g., the Internet. ACH-network services can be divided into five broad categories, (1) direct deposit services, (2) direct payment and home banking services, (3) electronic commerce, (4) electronic benefits transfers, and (5) electronic checking.

Returning now to FIG. 2, system 200 further includes a manual receipt 212 that can be accepted in addition to, or instead of, electronic transfer funds from DDA 202. Either way, a settlement account 214 is credited with the money. A services fee account 216 is credited by a debit to settlement account 214 and transferred to an operating account 218 belonging to payment service provider 210. An enrollment fee account 220 is used to receive up-front subscription fees from subscriber 204 that may be required for use of payment service system 200. A commission fees account 222 is used to receive miscellaneous fees that may be earned from sponsor 206, ODFI 208, or others. All such enrollment fees, service fees, and commissions contribute to the operating account of service provider 210.

A number of earmarked custodial accounts 224 are credited with money debited from settlement account 214 in the name of client sponsor 206. This may occur, for example, at the request of service provider 210 using ACH-format PPD. Such money is collected to pay an FNMA, GNMA, FHA, etc., mortgage loan, car loan, credit card debt, or the like. Thus, in one embodiment system 200 facilitates asynchronous debiting relative to the subscriber's payroll cycles, and crediting based on the due dates of various obligations. Prior art systems are simply driven to debit and credit solely on the due dates of the obligations.

Funds are then periodically withdrawn from custodial accounts 224, in one case, to a check disbursement settlement account 226 so that a series of paper checks 228 can be issued. In another case, funds are periodically withdrawn from custodial accounts 224 to an EFT disbursement settlement account 230. In one embodiment, service provider 210 instigates both these kinds of transfers with PPD instructions in ACH-30 format. After all the required payments are made on behalf of subscriber 204, a curtailment can be calculated.

Surplus funds in custodial accounts 224 may trigger a collection of unpaid service fees (USF). This results in a transfer of USF from custodial accounts 224 to service fees account 216 by PPD in ACH-format. A corporate trade exchange (CTX) ACH-format may be used to transfer funds from EFT disbursement settlement account 230 to a sponsor payment clearing account 232. This is handled by an EDI process initiated by service provider 210. Such CTX transfer can include BPR and ADX segments, for example. Payments are then ultimately transferred to a sponsor servicing system 234 from sponsor payment clearing account 232. A standard lockbox layout format may be used, that is triggered by the receipt of the CTX transactions.

A typical transaction flow between sponsor 206 and service provider 210 includes a solicitation tape from sponsor 206, new additions from service provider 210, refresh records from sponsor 206, account status changes from service provider 210, and account status changes from sponsor 206. Sponsor-generated transactions can also include investor sales/transfers, service releases, payoffs/paid-in-fulls, foreclosures, bankruptcies, payment changes, and delinquent payment information. Conversely, service-provider generated transactions can also include updated first payment dates, suspended accounts, terminated accounts, custodial account balances, next and last withdrawal information, reactivated accounts, and letter-writer queue records.

Figure 3:
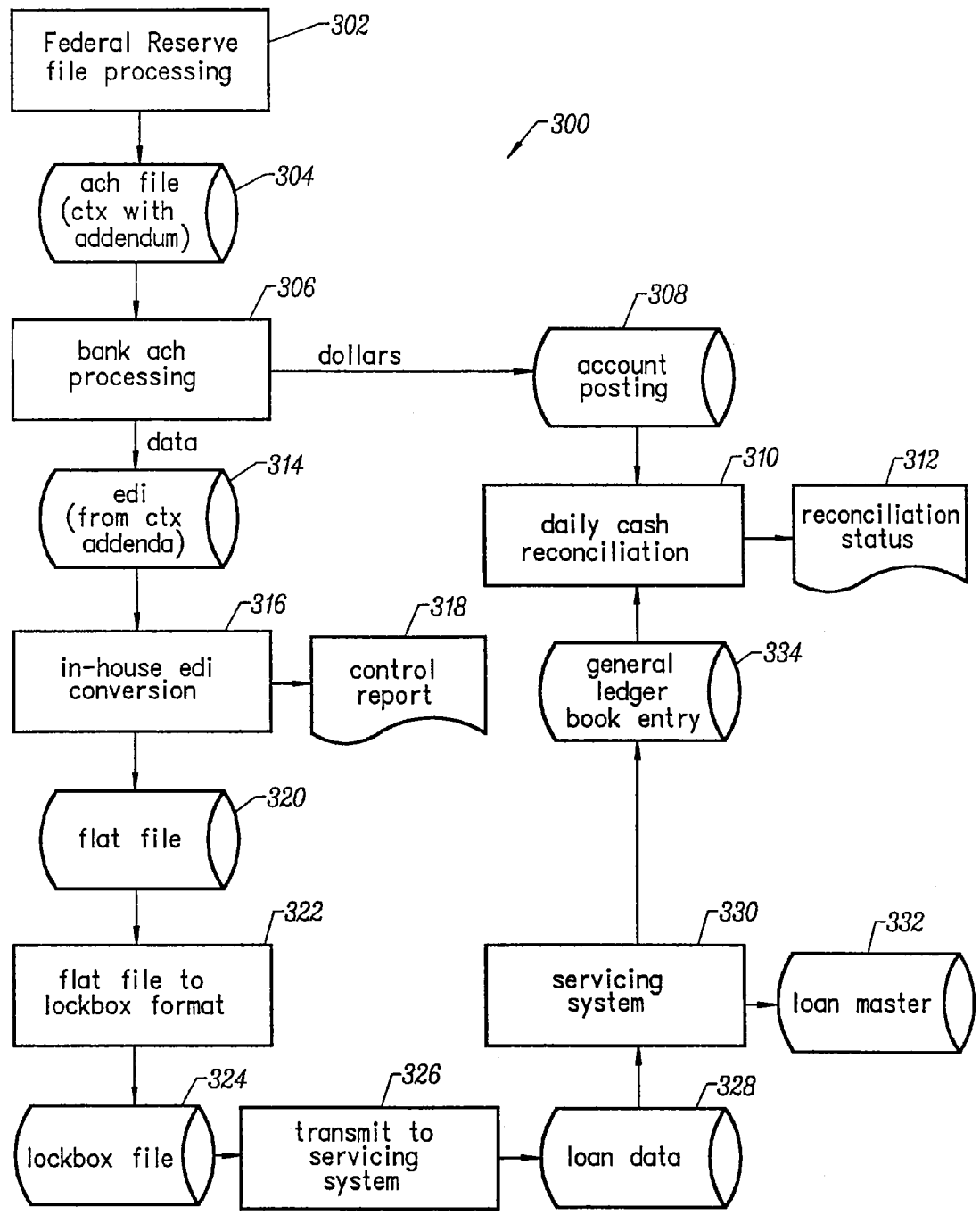
FIG. 3 is a flowchart diagram of a service provider and sponsor lockbox process according to an embodiment of the present invention.

FIG. 3 represents a service provider and sponsor lockbox process 300. A step 302 begins with ACH file processing, e.g., by the Federal Reserve. This fills an ACH-file 304 in CTX format with addendums. A step 306 represents a bank's ACH processing, e.g., PepPlus. "Dollars" are then transferred to an account posting file 308 and contribute to a daily cash reconciliation report 310. A paper reconciliation status 312 is output. "Data" is transferred from the step 306 to an EDI file 314 from the CTX addenda. An in-house EDI conversion step 316, e.g., Sterling, is used to provide a control report 318 and a flat file 320. A flat-file to lockbox format conversion step 322 produces a lockbox file 324. Such is transmitted in a step 326 to a loan-data file 328. A serving system step 330 produces a loan-master file 332 and a general ledger book entry file 334. The daily cash reconciliation step 310 combines information from both account posting file 308 and general ledger file 334.

In general, embodiments of the present invention comprise a bill-paying system with a customer deposit account that receives periodic payroll deposits of an individual or a couple. A bill-paying service enrolls the individual or couple for a fee, and is authorized to transfer money from the deposit account to the accounts of various creditors. An ODFI, such as a bank, actually handles the transfers of money, and such transfers are preferably all done electronically. The ACH-network supports such electronic money transfers. The various bills and debts of the individual or couple come due at times that may be asynchronous to their income structure. The bill-paying service is authorized to debit the deposit account for more than the basic minimums due one or more creditors each month. Such excess is used to accelerate the repayment of various loans and debts according to what particular application at that time will have the greatest long-term beneficial effect.

The ACH-network is based on a series of agreements between the company and its financial institutions, between trading partners, between the employer and its employees/retirees, between the billing company and its customers, among financial institutions, and between the financial institution and its customers. The basis for these agreements is the ACH rules: a complete guide to the rules and regulations governing the ACH-network. These rules and operating guidelines are developed and promulgated by the national automated clearing house association (NACHA). Rules and conventions for specific applications such as cross-border payments, financial EDI, electronic benefits transfers (EBT), electronic check, and consumer-initiated bill payments are developed by NACHA's councils: the cross-border council, the bankers EDI council, the EBT council, the electronic check council, the bill payment council, and the Internet council.

In order to participate in electronic payments, businesses must enter into agreements with the originating financial institutions of their choice and with the receivers of the transactions, e.g., employees, retirees, consumers, or other businesses. These agreements define the rights and responsibilities of each party to the transaction. The agreement between the business and the financial institution also establishes the method and procedures by which the payments are processed and settled.

The authorization by the receiver generally includes provision of a financial institution name and routing number and the appropriate account number for the transactions. According to a preapproved schedule, the business submits computer files usually in the ACH standard format to its ODFI for processing. ACH software for personal computers, local area networks, and mainframe computers is readily available in the marketplace. Even the smallest companies can take advantage of the efficiencies of the ACH payments system. In addition, many service bureaus and financial institutions provide a variety of conversion and computer services to assist businesses. This book-electronic payments review and buyers' guide-contains listings and contact for the providers of ACH products and services.

There are currently four ACH payment formats available to meet company and business needs for timely disbursements and collections. These are cash concentration or disbursement (CCD), cash concentration or disbursement plus addenda (CCD+), corporate trade exchange (CTX), and the soon-to-be obsolete corporate trade payments (CTP). It will be appreciated by those skilled in the art that the present invention is not limited by the particular ACH payment format(s) used. Addenda records allow the CCD+, CTP and CTX formats to both electronically transmit payments and payment-related information in standard formats between financial institutions.

The CCD payment format is the only corporate format that is not accompanied by addenda records. However, a reference number is placed in the entry detail record so that the payment and remittance advice can be reconciled by the seller (receiver).

The CCD+ format is the same as the CCD format with the addition of one addenda record. Part of the addenda record contains a payment-related information field in which data segments as defined by ASCIIx12 or NACHA-endorsed banking conventions are used. This addenda record allows the transmission of limited remittance information related to the payment.

The CTX format allows a company or business to electronically transmit one payment to cover multiple invoices and associated remittance information. The CTX format allows up to 9,999 addenda records. For CTX entries, the addenda are linked together with each succeeding addenda record carrying the next 80 characters of the message. The complete ASCIIx12 820 or 835 transaction set is "enveloped" within the CTX addenda records.

Figure 4:
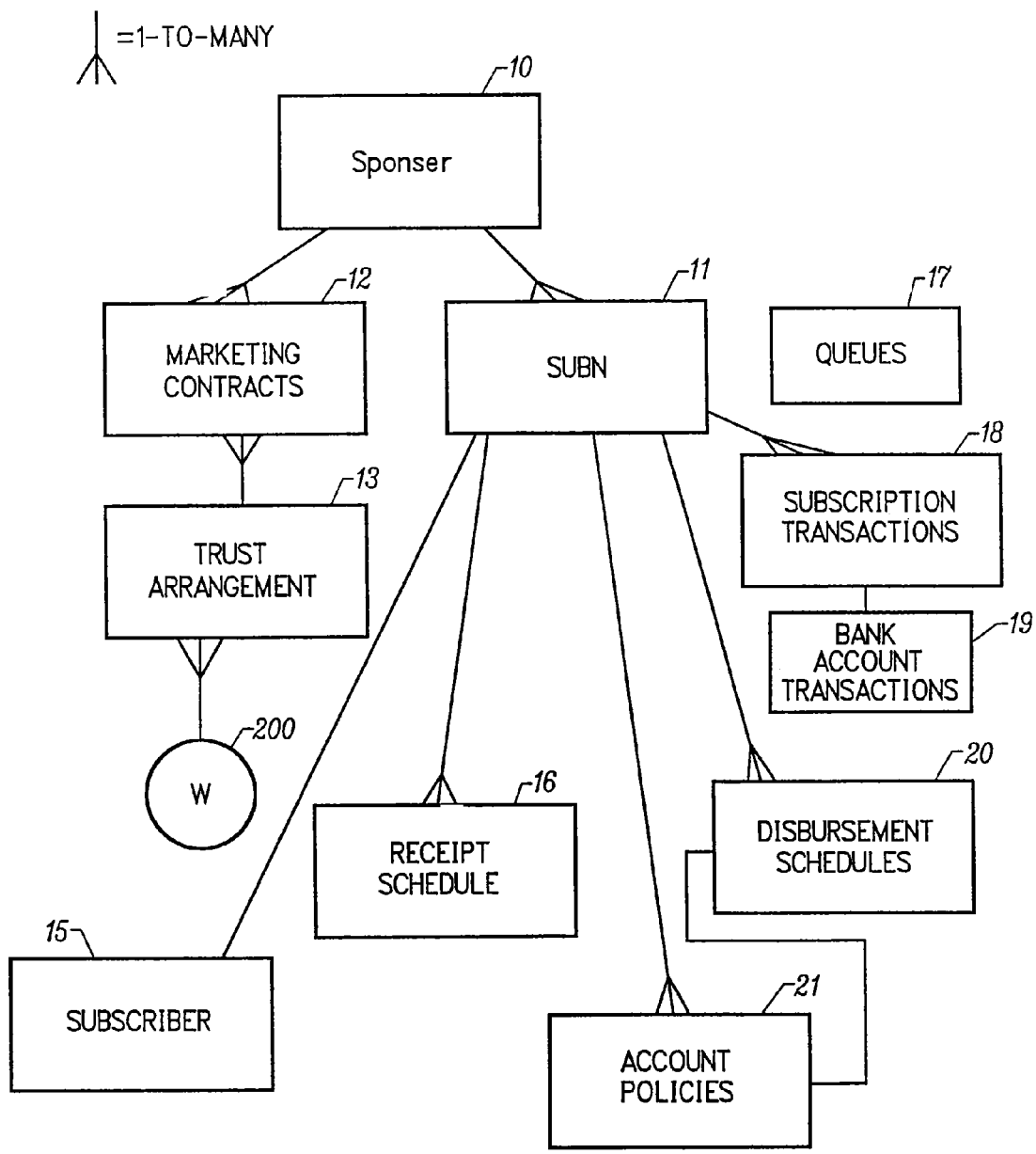
FIG. 4 is a block diagram of a debt repayment system.

FIG. 4 is a block diagram of a debt repayment system. In such a system, a sponsor 10 may have a plurality of marketing contracts 12 which are under supervision of a trust arrangement 13. The trust arrangement is used to move money as set forth on FIG. 2 (200). In FIG. 4, a "W" is used to represent the four legs of money movement shown in FIG. 2. In contrast to the prior art arrangement, one aspect of the present invention is that each leg of the W moves money independently of each other leg. Thus, the invention can route money along each leg of the W as desired. Unlike the prior art, the invention therefore provides the asynchronous movement of money pursuant to a trust arrangement.

Continuing with FIG. 4, a subscription 11 is established for a subscriber 15. The subscription may have one or more receipt schedules 16. The subscription also includes one or more disbursement schedules 20 and one or more account policies 20. The disbursement schedules and account policies bear a one-to-one relationship. That is, an account policy may only have a single disbursement schedule and a disbursement schedule may only be associated with a single account policy. The subscription may also include a plurality of subscription transactions 18 as established through queue 17. Each subscription transaction may include a corresponding bank account transaction 19.

Figure 5:
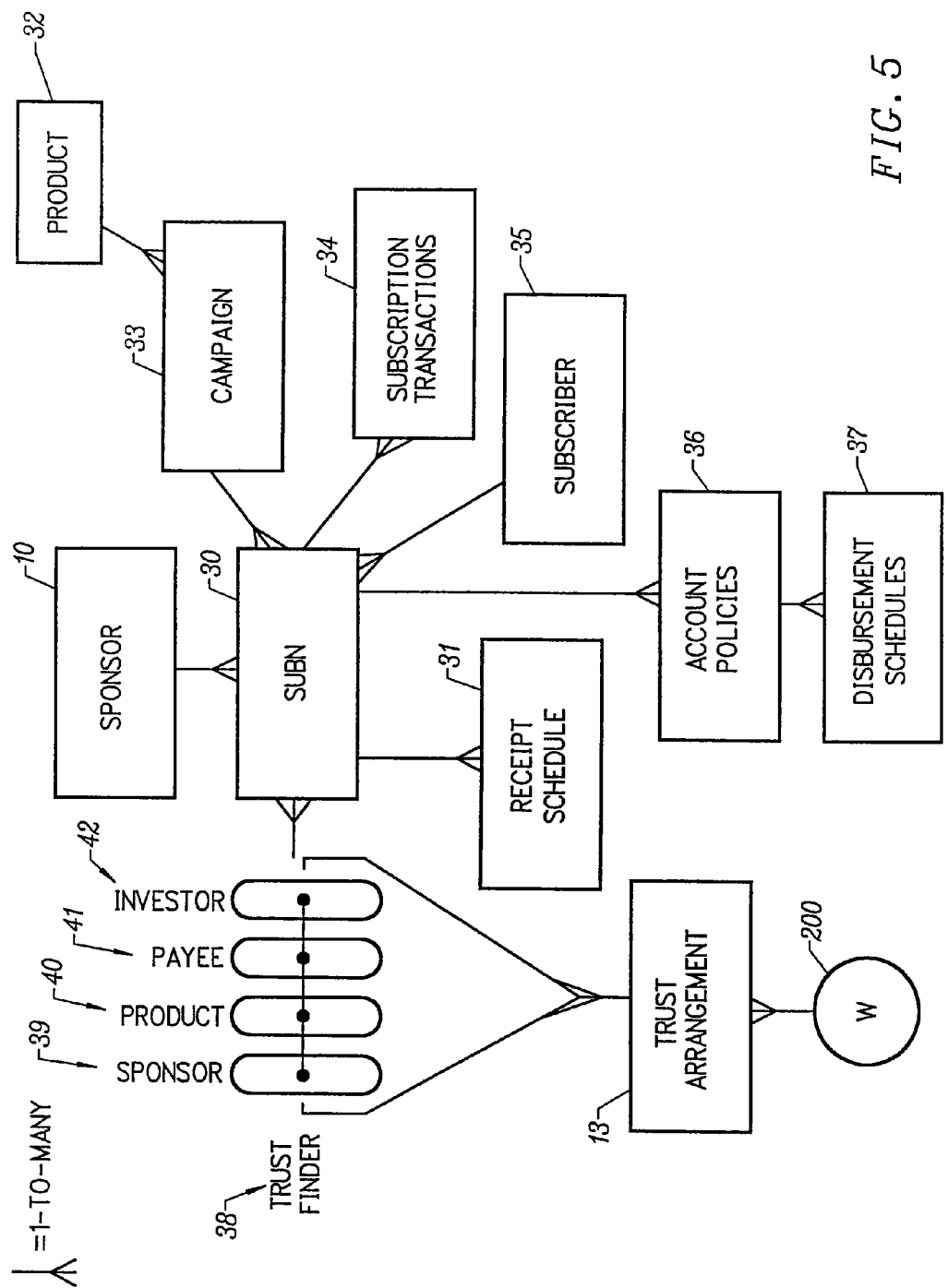
FIG. 5 is a block diagram of a debt repayment system according to the present invention.

FIG. 5 is a block diagram of a debt repayment system according to the present invention. It should be noted at the outset that key architectural improvements are provided over the system shown on FIG. 4. Some embodiments of the present invention include one or more of the following features:

1. Each subscriber may be associated with multiple transactions involving the movement of money;
2. A single subscription transaction table may be provided which contains all data for moving money;
3. A subscriber can have one physical loan with multiple recurring payment records, i.e. there is a logical grouping of disbursements for a given instrument;
4. A trust finder function provides a join across multiple tables for trust arrangements to map money movements; and
5. A campaign product is provided for managing money based upon product type and destination of funds.

The foregoing features of the invention provide flexibility to allow movement of money independently along each leg of the money path, i.e. the "W" of FIG. 2. However, unlike the prior art, the foregoing advantages are provided by the present invention.

Limitations of the prior art include the fact that a customer has a single subscription with a single balance to a single custody account. Thus, the prior art uses one money movement pattern per customer. The present invention, however, provides multiple money movement patterns per customer. Thus, multiple products may be provided with different characteristics, i.e. some may pay interest while others may not pay interest. Thus, a single customer may be provided with a mortgage acceleration product that does pay interest and a credit card restructure product that does not pay interest.

In some embodiments, the present invention makes use of multiple sources of funds or credits to a customer account. This may occur, for example, in the event the customer has more than one job or source of steady income. Credits may also occur when the customer is a couple owning a joint account. Additionally, some embodiments of the present invention provide for the payment of multiple debts, bills, membership dues, or the like. Further, in some embodiments the payments of the customer's debts are not tied to the customer's income schedule. In this manner, debits may be made to the customer's account with the monies debited credited to an intervening account or custody account. Debits are then made to the custody account to pay bills, mortgage payments, participate in equity acceleration programs, or the like. Debits to the custody account may be in synch with the subscriber's income schedule, or in an asynchronous schedule relative to the subscriber's income.

As shown in FIG. 5, a sponsor 10 may have many subscriptions 30. Each subscription can include a plurality of receipt schedules 31. Each subscription may also include a plurality of subscription transactions 34. Additionally, with regard to a subscription 30, a plurality of subscribers 35 may be associated with a subscription. In contrast to the prior art, in which a subscription transactions includes a single bank account transaction, some embodiments of the present invention provide a single subscription transaction table which contains all data for moving money. Such an arrangement is efficient and reliable in that all information is contained in one location in contrast to the many locations required by the prior art.

As further mentioned above, a one-to-many subscriber arrangement is provided by an embodiment of the present invention. Thus, all money transactions for a subscriber may be maintained in a single file.

The present invention also provides a plurality of account policies 36 for a subscription, each of which may have a plurality of disbursement schedules 37. This aspect of the present invention provides a logical grouping of disbursements for a given instrument which stores and organizes data more efficiently.

In some aspects, the present invention provides exemplary data tracking for use by the lenders, creditors, banking institutions or the customer or subscriber. In one such embodiment, an accelerated repayment of an interest-bearing loan is accomplished for the subscriber in a way which provides feedback to the subscriber on the nature of accelerated payment. For example, the subscriber may be informed as to how quickly the loan will be paid off compared to the original loan term, and the associated savings in interest. Information on and related to the subscriber's account(s) and/or loan(s), as well as payments, payment schedules, savings and the like, may be maintained for a desired number of weeks, months, or years.

Some methods and systems of the present invention also provide a trust finder function 38 which, in one embodiment, includes tables for a sponsor 39, a product 40, a payee 41, and an investor 42. Trust finder 38 provides a join across the four tables which defines the trust arrangement in such a way to map money movements. Thus, additional attributes may be provided to define the money movement process. Such definition is crested by the join across the four tables.

In some embodiments, the trust finder function of the present invention will be useful in the event that money lent to the customer or subscriber requires repayment to be directed to two or more accounts. The trust finder function helps accomplish this goal by directing subscriber payments to the appropriate account(s). In another embodiment, the trust finder function helps identify the appropriate custodial account for deposit of a mortgage payment or the like. For example, two customers of a particular bank or lender may have different custodial accounts to which the mortgage payment should be made. For example, one customer's payment may be held in a custodial account at the bank. The second customer's payments may instead be held at a Fannie Mae custodial account, a Veterans Association custodial account, or other custodial account. In some embodiments of the present invention, a trust finder function helps facilitate allocation of the payment to the proper custodial account.

Some methods and systems of the present invention also provide a campaign product feature by which a campaign 33 may be offered to a plurality of subscriptions. Each campaign, in turn, may comprise a plurality of products 32. This arrangement allows the management of money based on product type where money is being remitted. Thus, a product may be sold among multiple campaigns.

In some embodiments of the present invention, the campaign product feature will be useful when a variety of products are marketed and sold under a variety of campaigns. For example, one product may require the customer pay an upfront fee prior to purchase of the product, prior to participation in an equity acceleration program, or the like. A product sold to a second customer under a different campaign product may have the sign-up fee spread out and included into a series of payments. As a result, when an accelerated repayment of the loan is made, the first customer may be able to apply the entire accelerated payment to the loan principal. In contrast, the second customer may first be required to repay the previously prorated sign-up fee, before the accelerated payments are applied to the loan principal. The present invention, in some embodiments, includes a campaign product management feature which helps determine the distribution of accelerated payments, extra payments, or the like, to the appropriate custodial accounts or lenders.

Figure 6A:
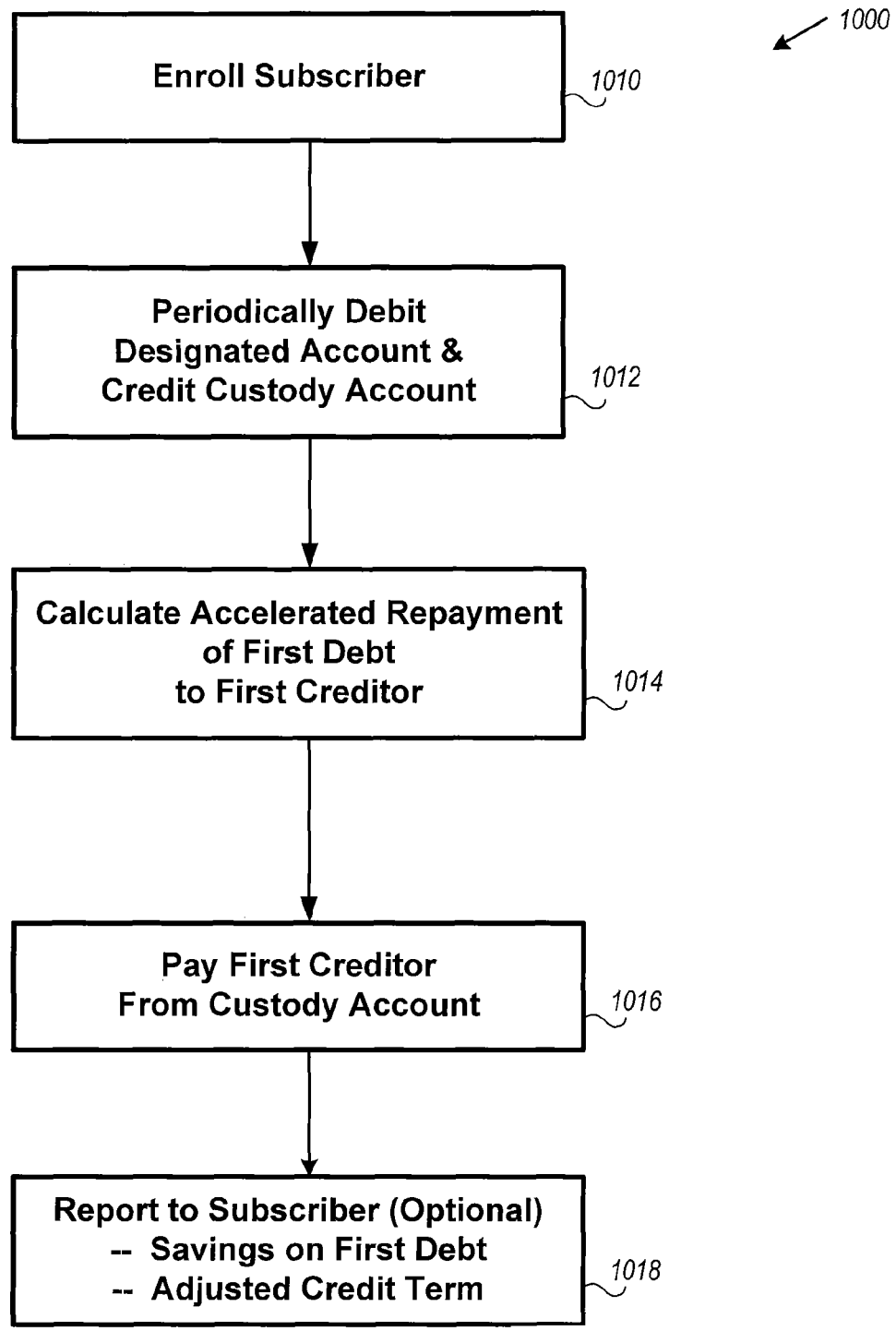
FIGS. 6A-6B are simplified flow charts illustrating embodiments of the present invention.

Turning now to FIG. 6A, a particular embodiment of the present invention will be described. FIG. 6A depicts a bill paying method 1000 using accelerated payments. Method 1000 includes enrolling a subscriber (Step 1010). The subscriber may be an individual or a couple, such as a married couple. The subscriber enrollment may require the payment of an enrollment fee for the services provided under method 1000. Preferably, the subscriber has access to a designated account, which may be a subscriber checking account, investment account, savings account, or the like. The designated account has sufficient funds deposited therein such that the designated account may be periodically debited in step 1012. In many cases, the designated account is a subscriber account into which one or more payroll deposits are automatically made. For example, the subscriber's place of business may provide a direct deposit plan for the direct deposit of the subscriber's paycheck into the designated account. In this embodiment, the subscriber establishes the direct deposit with their employer, for direct deposit into the subscriber's designated account.

As will be appreciated by those skilled in the art, the subscriber may have more than one job, each providing a direct deposit function, or the subscriber may be more than one individual who both work and have direct deposit of payroll available to them. In this manner, the subscriber's designated account may have multiple sources of credit or income. Further, while a payroll direct deposit is used as an example, a wide range of other payments may be regularly deposited into the subscriber's designated account. These may include, for example, social security payments, annuity payments, automatic dividend disbursements, disability payments, corporate or government pension payments, or the like.

The designated account is periodically debited, with monies debited from the designated account credited to a custody account established for the subscriber (Step 1012). The schedule on which the designated account is periodically debited need not correspond to the direct deposit(s) of the subscriber into the designated account. The amount and schedule of the periodic debiting of the designated account may be established a number of ways. For example, one method of the present invention involves the subscriber providing information on a series of loans, bills and other payments to be made from the custody account. A debit calculation mechanism then determines an amount and debit schedule for the periodic debiting of the designated account. Alternatively, the periodic debiting of the designated account is calculated by taking an average of the bills and loans to be repaid from the custody account over a certain period of time, such as one (1) month, six (6) months, twelve (12) months, or the like. In one aspect, the periodic debiting of the deposit account occurs in an amount that exceeds by a desired percentage (e.g., ten percent) the total payments to be made. In this manner, additional monies will be withdrawn from the designated account and made available for the accelerated repayment of one or more loans of the debtor subscriber.

Returning to FIG. 6A, in one embodiment an accelerated repayment of a first debt owed to a first creditor is calculated (Step 1014). Some or all of the accelerated repayment is then paid to the first creditor from the custody account (Step 1016). In an optional Step 1018, a report is issued to the subscriber. The report may include a summary of the savings on the first debt as a result of the accelerated repayment, an adjusted credit term of the first debt as a result of the accelerated repayment, or the like.

It will be appreciated by those skilled in the art that the accelerated repayment calculated in Step 1014 may occur through a variety of mechanisms and in a number of different ways. For example, if the custody account is used to repay only a single loan having a monthly payment, one method of calculating the accelerated repayment involves paying one-half (½) of the standard monthly payment every two weeks. Over a twelve (12) month period of time, twenty-six (26) one-half (½) month payments are made or the equivalent of thirteen (13) monthly payments. In this manner, one extra month worth of payments is made to reduce the first debt owed to the first creditor. Savings on the first debt and an adjusted credit term may be calculated in Step 1018 monthly, quarterly, semiannually, annually, or the like and reported to the subscriber.

In another embodiment, the calculated accelerated repayment of the first debt comprises payment of the standard loan repayment (monthly, or the like) with the inclusion of an additional principal payment to further reduce the loan. The additional principal payment may be a fixed amount included with each payment interval (e.g., monthly), or may vary from month to month depending in part on the amount of excess funds maintained in the custody account. This embodiment will be particularly useful in the event the custody account is used for the repayment of more than just a single loan.

Figure 6B:
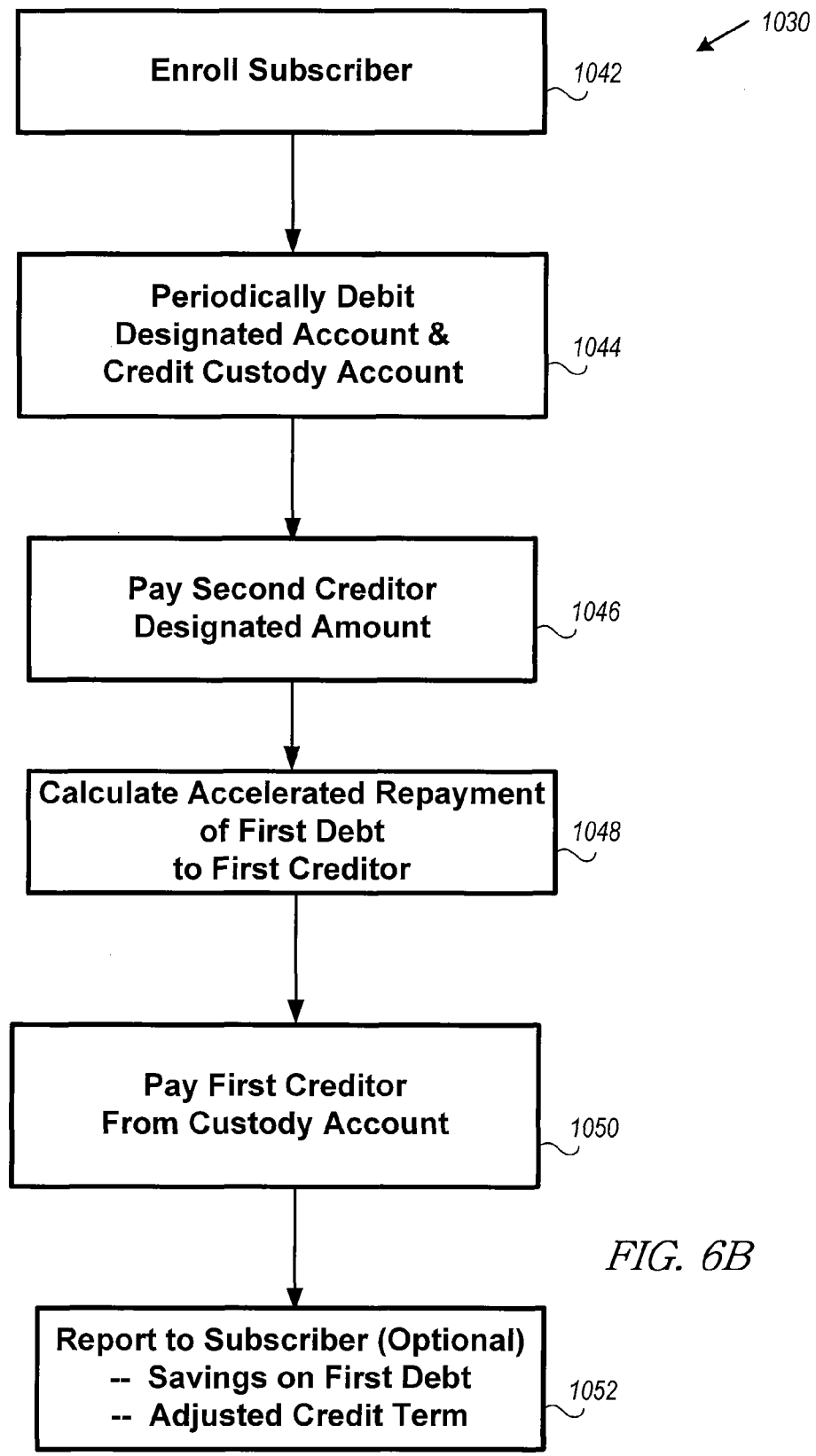

Another method of the present invention will be described for the prepayment of multiple debts from a custody account. As shown in FIG. 6B, a method 1030 includes enrolling the subscriber 1042 and periodically debiting a subscriber's designated account and crediting monies received from the designated account to the custody account (Step 1044). In one embodiment, Steps 1042 and 1044 are similar to Steps 1010 and 1012 described in conjunction with FIG. 6A.

Method 1030 includes paying a second creditor a designated amount (Step 1046). This may occur, for example, by the payment or repayment of a wide variety of bills, loans, or the like. The second creditor may, for example, be a utility. In this example, paying the second creditor involves paying the second creditor the subscriber's utility bill for a particular month. Further, some utilities provide an annual plan during which the usually variable utility costs are estimated and spread out into equal monthly payments over the year. In this case, paying the second creditor the designated amount would involve paying the utility the calculated monthly amount for that utility. In another embodiment, the second creditor is a health club or other association having monthly dues. In this case, paying the second creditor involves paying the club dues on or before the scheduled due date. In still another embodiment, the second creditor is a credit card company for which the subscriber wishes to pay either the minimum payment or a designated monthly payment to be paid towards a credit card balance. In this embodiment, Step 1046 involves paying the credit card company the designated amount to accomplish the subscriber directed goal.

In still another embodiment, the second creditor holds an interest bearing loan with the subscriber. In this embodiment, the subscriber pays a designated amount which may, or may not, be an accelerated repayment of the loan. In a particular embodiment, the second creditor is an automobile finance company from whom the subscriber borrowed money to purchase an automobile. In this manner, the designated amount paid to the second creditor may be the monthly car payment owed to the car loan note holder, or automobile or finance company.

Method 1030 includes calculating an accelerated repayment of a first debt owed to a first creditor (Step 1048), and then paying the first creditor from the custody account (Step 1050). In one embodiment, Steps 1048 and 1050 are similar to Steps 1014 and 1016 described in conjunction with FIG. 6A. While Steps 1048 and 1050 are shown following Step 1046, Steps 1048 and 1050, in another embodiment, precede Step 1046. In this manner, the first creditor is repaid on an accelerated repayment plan and thereafter the second creditor is paid the designated amount.

While method 1030 is described for a subscriber having two creditors, method 1030 is not so limited. Method 1030 may be used to facilitate the repayment of two, three, four, or more creditors of the subscriber. In this manner, method 1030 accomplishes the repayment of multiple loans and the payment of multiple bills, or the like, for a subscriber.

Again, optional reports are provided to subscriber, which may include, among other things, the savings projected on one or more debts as a result of the accelerated repayment, and/or an adjusted credit term on one or more debts as a result of the accelerated repayment. Further, reports to the subscriber may provide information or confirmation of the payment(s) made to the creditor(s). Reports to the subscriber may be provided a variety of ways. For example, a written report may be periodically printed and mailed to the subscriber. Alternatively, the report may be available in electronic form for the subscriber to access via a password protected website. Further, the subscriber may request that the report be periodically emailed to the subscriber at a designated email address. A number of other deliver mechanisms for reporting to the subscriber also are possible within the scope of the present invention.

Figure 7:
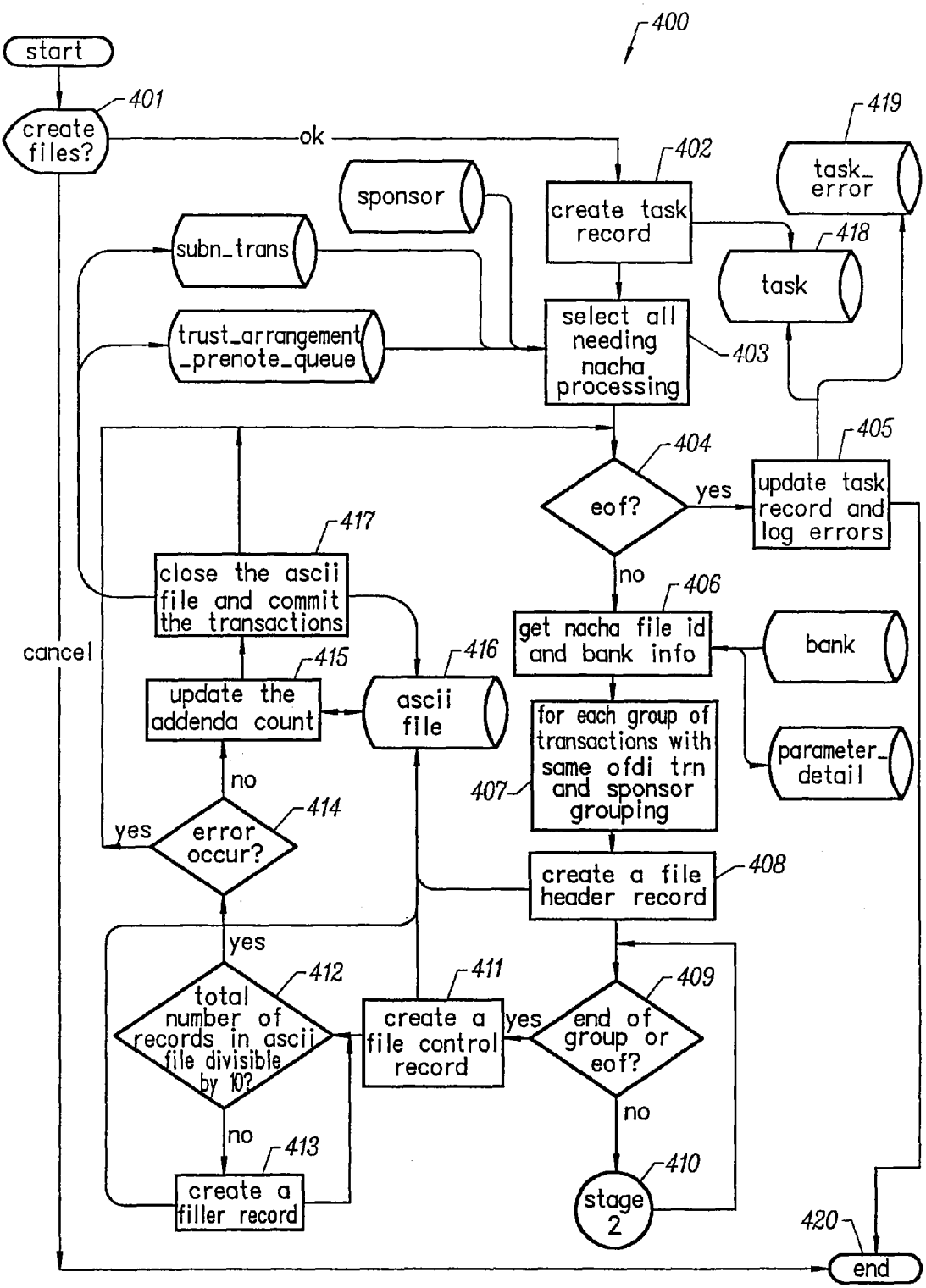
FIG. 7 is a flowchart diagram of a create ACH-file process according to an embodiment of the present invention.

FIG. 7 represents a create ACH-file process 400 that runs through the subscription transaction records and the trust arrangement prenote queue records that require NACHA processing. Process 400 creates an ASCII file of bank transaction instructions. An ASCII file is generated for each ODFI bank and appropriate sponsor combination included in the system. Upon successful creation of each ASCII file, the status of the associated subscription transaction or trust arrangement prenote queue changes. The process displays a message box in a step 401 to ask if the user wishes to create an ACH file. If the user chooses to cancel the process, the process is aborted. Otherwise, process 400 creates a task record in a step 402. In a step 403, the process selects all subscription transaction and trust arrangement prenote queue records that require NACHA processing. It sorts the transactions by sponsor grouping requirements, ODFI transit routing number, transaction date, queue type, ODFI account number, RCVG transit routing number, RCVG account number and NACHA transaction code. An end-of-file test 404 checks to see if all the transactions have been processed. If so, a step 405 updates the task record and logs any errors. A step 406 retrieves a NACHA File ID and the bank information. A step 407 sorts out each group of transactions that have the same sponsor grouping requirement and ODFI transit routing number. A NACHA File header record is created in a step 408. A test 409 checks to see if this is the end of a group or and end-of-file. If not, processing continues on to process 500 (FIG. 5) through a connector 410. A step 411 creates a NACHA file control record. A test 412 checks if the total number of records in an ASCII file is divisible by ten. If not, a step 413 creates filler records to bring the count of records up to a multiple of ten. A test 414 looks to see if any errors have occurred. If not, a step 415 updates an addenda count in a NACHA ASCII file 416. A step 417 closes the NACHA ASCII file 416 and then commits the transaction updates. The step 405 updates a task file 418 and a task-error file 419. An exit 420 ends the process.

Figure 8:
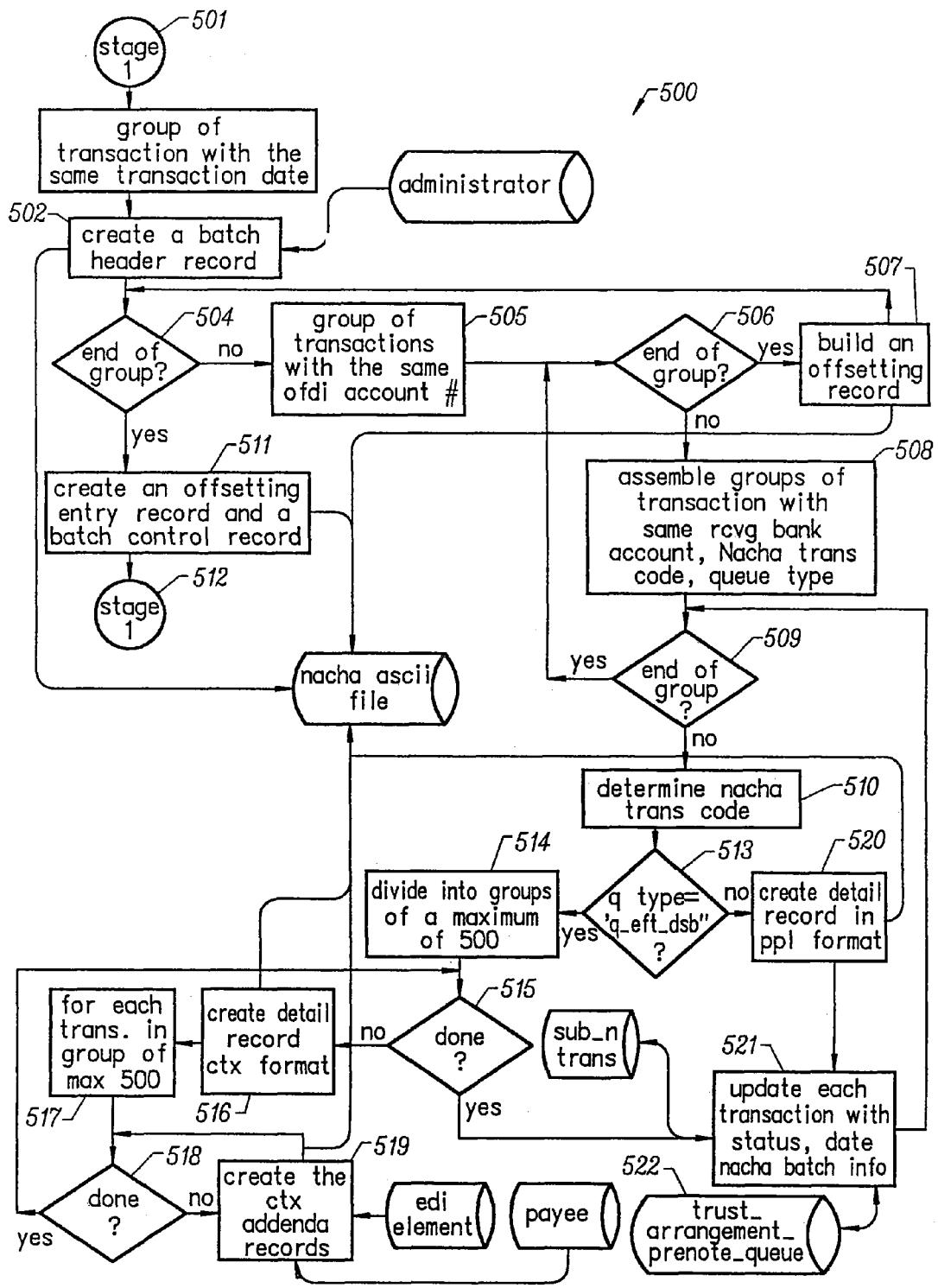
FIG. 8 is a flowchart diagram of a second part of the create ACH-file process of FIG. 7.

FIG. 8 represents a process 500. A connector 501 continues from connector 410 (FIG. 4). In a step 502, for each group of transactions that have the same transaction date, the process creates a NACHA batch header record. A test 504 checks to see if this is the end of a group. In a step 505, for each group of transactions that have the same ODFI account number a test 506 checks for the end of the group. If yes, a step 507 builds an offsetting record and returns to test 504. If test 506 is no, then a group of transactions that have the same RCVG bank account, NACHA trans code and queue type are assembled. If this is the end of such a group, then a test 509 returns control back to test 506. Otherwise, a step 510 is used to determine the NACHA trans code. If the answer in test 504 was yes, a step 511 creates an offsetting entry record and batch control record. Control is returned through a connector 512 back to process 400.

A test 513 checks to see if the transaction's queue type is "EFT DSB." If so, a step 514 divides the set of transactions having the same RCVG transit routing number, RCVG account number and NACHA transaction code into groups of five hundred transactions or less. A test 515 checks if all such groups of five hundred or less transactions have been processed. A step 516 and 517 creates a NACHA detail record in CTX format. A test 518 checks if all the transactions in a group have been processed. Each transaction included in the NACHA detail record is used in a step 519 to create a set of NACHA CTX addenda records formatted by the payee's EDI element records. If the answer in test 513 is no, then a step 520 creates a NACHA detail record in PPL format. A step 521 updates the status of each subscription transaction or trust arrangement prenote in a queue 522 to "cleared" or "pending". (Pending status only applies to prenote and receipt transactions.)

Figure 9:
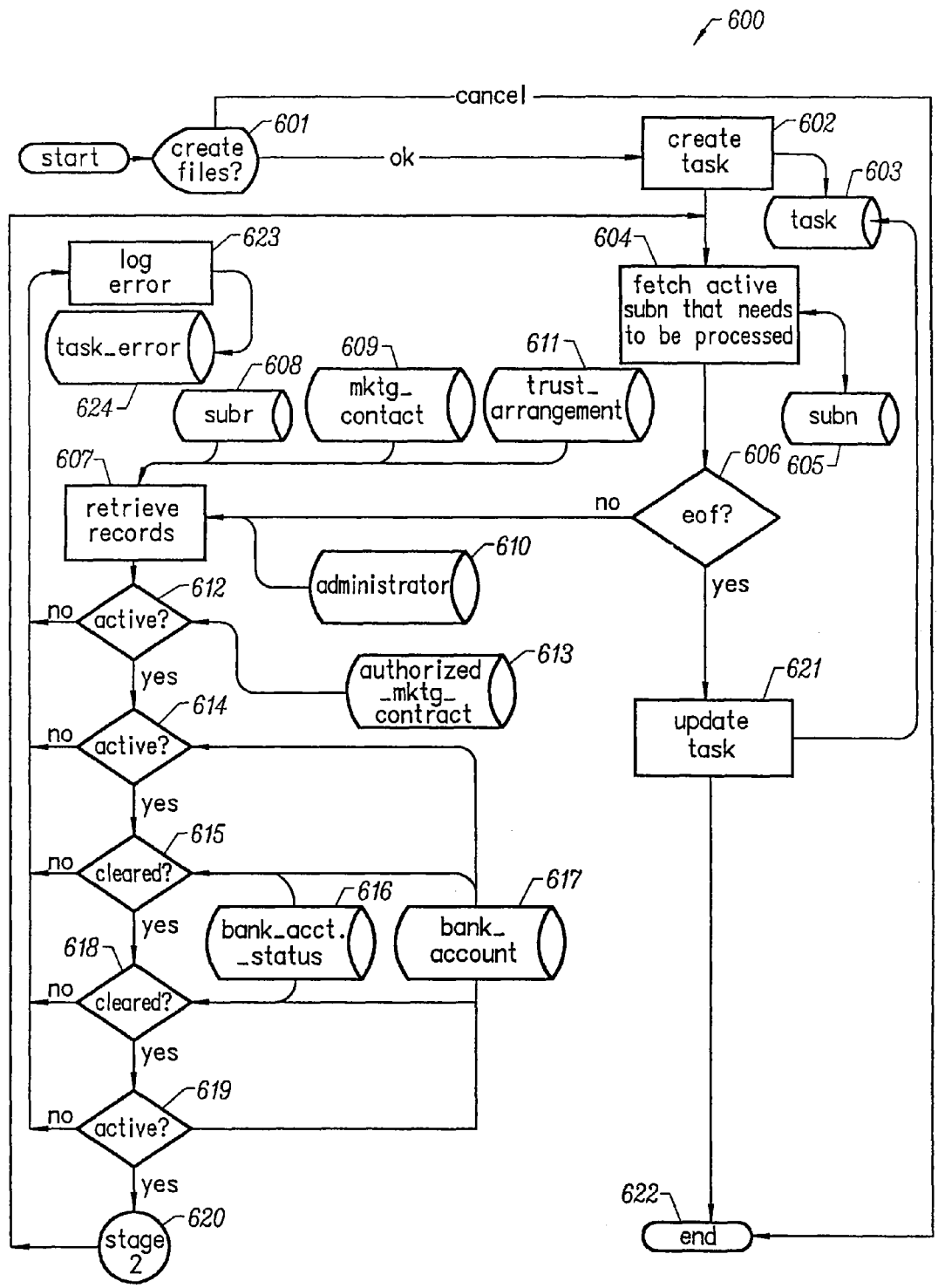
FIG. 9 is a flowchart diagram of a generate receipts/disbursements process embodiment of the present invention.

FIG. 9 represents a generate receipts/disbursements process 600 that runs through active subscriptions, and generates subscription transactions for each active receipt schedule or disbursement schedule that is scheduled to cycle. A step 601 displays a message box to ask if the user wishes to generate receipts and disbursements. If the user instead chooses to cancel the process, the process is aborted. A step 602 creates a task record in a task file 603. Each active subscription that is associated with either an active disbursement schedule or an active receipt schedule that has a next cycle initiate date that is less than or equal to the current system date is fetched by a step 604 from a subscription file 605. The subscriptions are sorted by the trust arrangement. A test 606 looks for an end-of-record. If not, a step 607 retrieves records associated with the subscription from a subscriber file 608, a marketing contract file 609, an administrator file 610, and a trust arrangement file 611. A test 612 validates the records associated with the subscription to see if there is an authorized marketing contract that it is active prior to or on the current system time. This is done by looking in an authorized marketing contract file 613. A test 614 verifies that the particular bank account, or receipt account specified by the subscriber trust arrangement, is active. A test 615 checks to see if the holding account specified by the subscriber trust arrangement is active and the bank account status is cleared. A bank-account-status file 616 and a bank-account file 617 are consulted. A test 618 checks to see if the service fee account specified by the subscriber trust arrangement is active and the bank account status is cleared. A test 619 checks to see if the EFT disbursement account specified by the subscriber trust arrangement is active.

When all of the records associated with a subscription pass validation, e.g., tests 614, 615, 618, and 619, control passes to process 700 through a connector 620. If the end-of-file is encountered in test 606, a step 621 updates the task file 603. Process 600 then ends at an exit 622. If any of the records associated with a subscription fail validation, e.g., tests 614, 615, 618, and 619, control passes to step 623 that logs the error in a task-error file 624.

Figure 10:
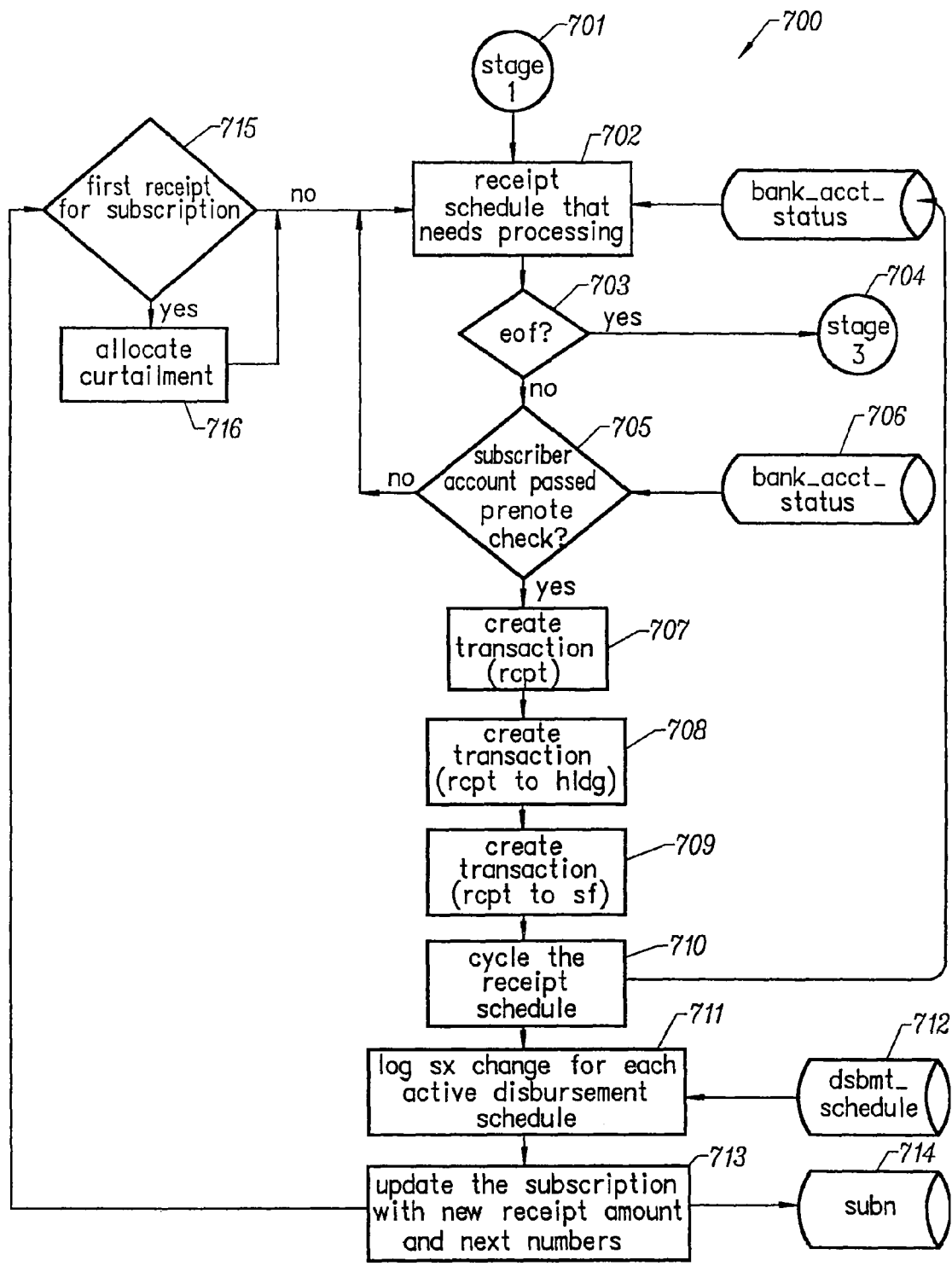
FIG. 10 is a flowchart diagram of a second part of the generate receipts/disbursements process of FIG. 9.

FIG. 10 represents a stage 2 process 700. A connector 701 receives control from connector 620 in process 600. Each receipt schedule that needs processing passes through a step 702. A test 703 looks for an end-of-file marker in the file. If one is found, control passes through a connector 704 to a process 800. A test 705 sees if the schedules' associated bank account status 706, the subscriber account specified by the receipt schedule, has passed the prenote process and the schedule also has a receipt method code of EFT. A step 707 creates the transaction records that are associated with the retrieval of the receipt funds from the subscriber's account to the receipt account. A step 708 creates the transaction records that are associated with the movement of the receipt base amount from the receipt account to the holding account. A step 709 creates the transaction records that are associated with the movement of the receipt service fee amount from the holding account to the service fee account. A step 710 cycles the receipt schedule. A step 711 logs an SX change record for each active disbursement schedule associated with the subscription that has a payee requiring notification. The log is maintained in a disbursement schedule file 712. A step 713 updates the subscriptions current balance with the receipt amount and changes the subscription transaction next number in a subscription file 714. A test 715 checks if the process is working on its first receipt schedule for this subscription. If yes, then a step 716 allocates a curtailment to the subscriber disbursement schedules. If the schedules associated bank account status (subscriber) has not passed the prenote process, or the schedule does not have a receipt method code of EFT, then the process skips the receipt schedule and processes the next schedule.

Figure 11:
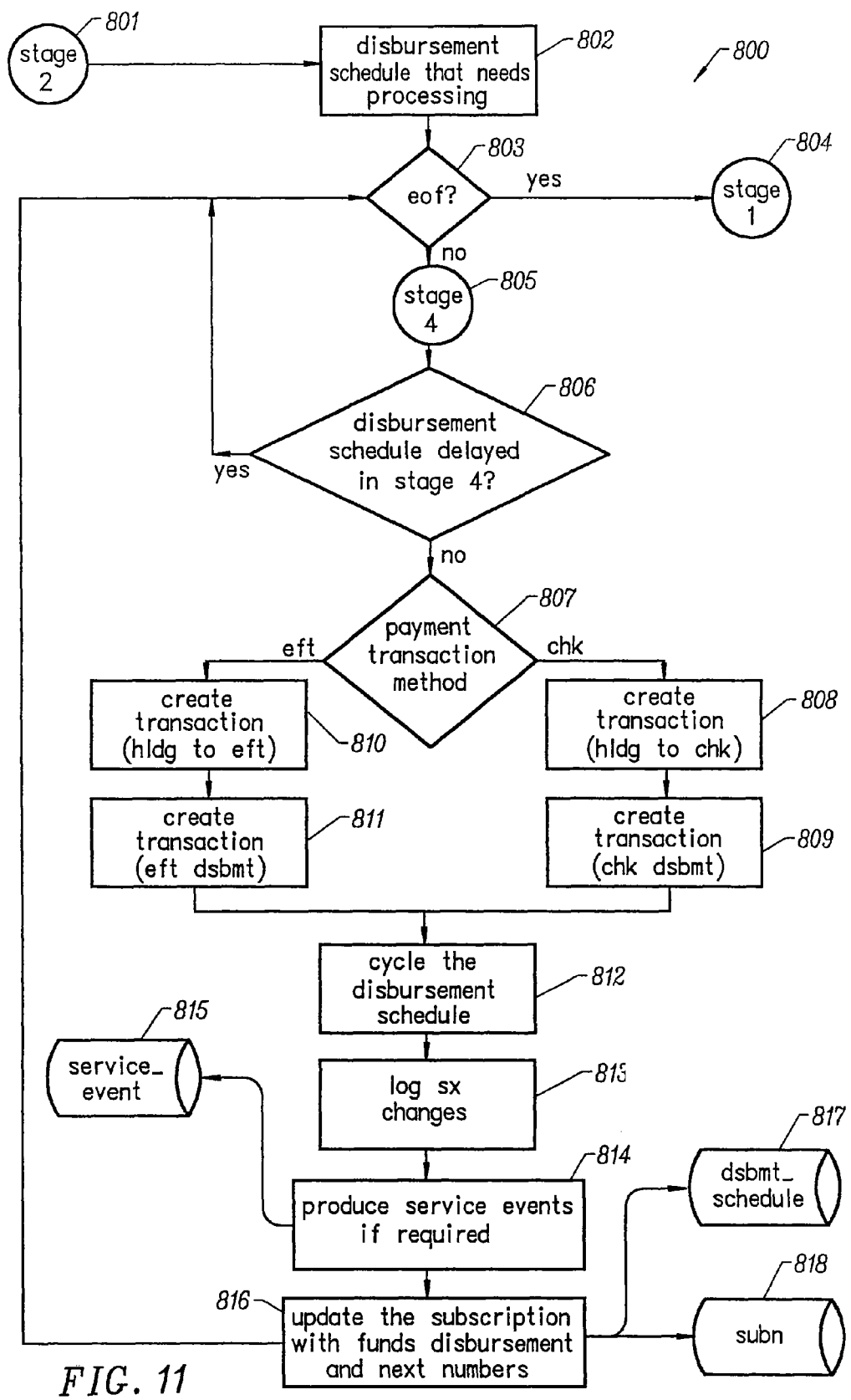
FIG. 11 is a flowchart diagram of a third part of the generate receipts/disbursements process of FIG. 9.

FIG. 11 represents a process 800 that is entered through a connector 801 from connector 704 in process 700. Each disbursement schedule that needs to be processed passes through a step 802. A test 803 looks for an end-of-file marker in the file. If one is found, control passes through a connector 804 to the process 600. Otherwise, a subroutine call 805 is made to process 900. A return is made to a test 806 which looks to see if the disbursement is delayed in process 900. If not, a test 807 checks if the payment transaction method is to be electronic funds transfer (EFT) or by check (CHK). If CHK, then a step 808 creates the transaction records that are associated with the movement of the disbursement amount from the holding account to the check disbursement account. A step 809 creates the transaction records that are associated with the creation of the corresponding check. If the payment transaction method is by electronic funds transfer, a step 810 creates the transaction records that are related with the movement of the disbursement amount from the holding account to the EFT disbursement account. A step 811 creates the transaction records that are associated with the payment of the disbursement amount to the payee. A step 812 cycles the disbursement schedule. A step 813 produces a SX change record. A step 814 produces a series of appropriate service events in a file 815. A step 816 updates the subscriber current balance, funds disbursed, and "next" numbers. Such updates are sent to a disbursement-schedule file 817 and a subscription file 818.

Figure 12:
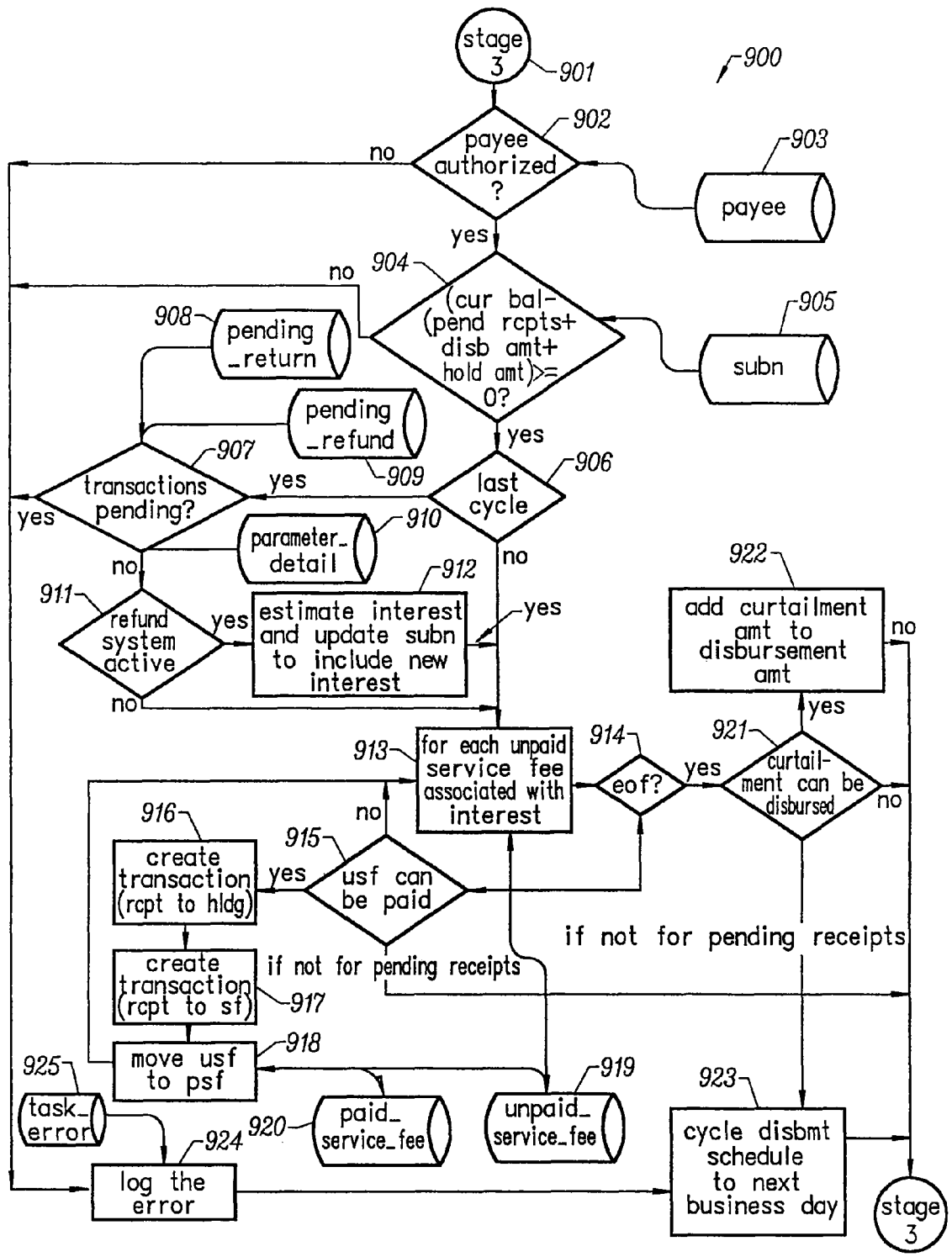
FIG. 12 is a flowchart diagram of a fourth part of the generate receipts/disbursements process of FIG. 9.

FIG. 12 represents a process 900 that is entered through a connector 901. A test 902 checks to see if the payee is authorized according to a payee list in a file 903. If so, a test 904 checks to see if the scheduled funds are disbursed, will the subscriber available current balance remain above zero? (E.g., available current balance=SUBN.CURRENT_BALANCE_AMT−(SUBN.PENDING_RCPT+SUBN.HOLD_AMT)) A subscription file 905 provides data for the calculation. If yes, a test 906 looks to see if this is the last cycle the disbursement schedule is being processed. If yes, a test 907 checks if there any pending transactions. A pending-return file 908, a pending-refund file 909, and a parameter-detail file 910 provide data for test 907. If the answer to test 907 is no, a test 911 checks if the refund system is active. If not, a step 912 estimates all unallocated interest and updates the subscription file to include new interest and decreases the subscriber minimum allowable balance to zero.

Each unpaid service fee passes through a step 913. A test 914 looks for an end-of-file. If not the EOF, a test 915 sees if there are any unpaid service fees associated with the subscription that have an amount that is less than or equal to the disbursement schedule curtailment amount and the process determines that it can pay the fee. If unpaid service fees can now be paid, a step 916 creates transaction records to withdraw such service fees from the subscriber holding account. A step 917 creates the transaction records that are associated with the deposit of the service fee amount into the service fee account. A step 918 moves the unpaid service fee record in a file 919 to the paid service fee table and changes the status to "paid" in a file 920. The service fee amount is removed from the subscriber current balance, pending curtailment amount, and pending use amount.

If the EOF is reached in test 914, a test 921 checks to see if the curtailment can be disbursed. If so, a step 922 removes the service fee amount from the disbursement schedule's pending curtailment amount. In a step 923, if there are any unpaid service fees associated with the subscription that have an amount that is less than or equal to the disbursement schedule curtailment amount, and the process determines that the only thing stopping the payment of the unpaid service fee is the pending receipts, the disbursement is delayed until the next cycle. A step 924 logs any errors in a file 925.

Embodiments of the present invention further include an allocate curtailment program, a calculate-next-cycle dates program, a create-transaction program, an estimate-interest program, a get-schedule-status program, and a log-SX-change program. A next-cycle-dates calculation tests to see if the disbursement schedule is being delayed one business day. If so, the disbursement_schedule.next_initiate_date is incremented by one business day and is verified by a calendar table. The disbursement_schedule.next_transaction_date is incremented by one business day. And if the disbursement_schedule.next_ideal_date is older than five days, the process logs an error into a task-error table. Otherwise the process cycles the receipt or disbursement schedule according to the schedule's cycle type.

For the last cycle calculation, if all of the disbursement schedules associated with the subscription are closed except for the disbursement schedule that is currently being processed, and the disbursement schedule that is currently being processed will not cycle again prior to its end date, the projected disbursement schedule's next initiate date, then the subscription is on its last cycle.

For the fee payment calculation, if the unpaid service fee amount is less than or equal to the disbursement schedule's pending curtailment amount, the unpaid service fee can be paid if the payment of the unpaid service fee would not decrease the subscriber current balance below the subscriber minimum balance allowed, while also subtracting the subscriber pending receipt amount. Or if the payment of the unpaid service fee would not decrease the subscriber current balance below the subscriber minimum balance allowed, but requires the use of the subscriber pending receipt amount, the unpaid service fee can be paid, if the disbursement schedule was delayed until the pending receipt amount cleared. Otherwise, the unpaid service fee cannot be paid.

For the curtailment payment calculation, if the disbursement schedule is capable of curtailing money and its curtailment amount is greater than its minimum, the curtailment amount can be included in the disbursement if the payment of the curtailment amount does not decrease the subscriber currant balance below the subscriber minimum balance allowed, while also subtracting the subscriber pending receipt amount. Or if the payment of the curtailment amount does not decrease the subscriber current balance below the subscriber minimum balance allowed, but requires the use of the subscriber pending receipt amount, the curtailment amount could be included in the disbursement, if the disbursement schedule was delayed until the pending receipt amount cleared. Otherwise, the curtailment amount cannot be disbursed.

For the create service event, if the sponsor associated with the subscription requires the creation of an initial enrollment service event at the time of the first disbursement and the current disbursement schedule is the subscriber primary disbursement schedule and it is on its first cycle, and if the subscription has enrollment fees that are unpaid, the process produces an "enpart" service event. Otherwise, the process produces an "enfull" service event. If the subscriber primary disbursement schedule is being processed, the process creates a "dsbfamt"service event. Otherwise, the process creates a "dsbsamt" service event. If an enrollment service fee was paid during the processing of the current disbursement schedule, the process creates an "endfrd" service event.

An allocate-curtailment program assigns portions of a specified subscriber calculated future minimum balance to each of the associated disbursement schedules that are active and have been configured to receive curtailment. The calculate next-cycle-dates calculates cycle dates given the transaction type, cycle type code, clearing delay, last ideal date and special parameters for semi-monthly loans. The create-transaction program creates the necessary transactions for subscription activity, including subscription transactions, subscription bank account business month and bank account business month records. The estimate interest program estimates interest that has not been allocated in the past for a specified subscription. The process stores the estimated amounts in the appropriate subscriber bank account bus month ("sbabm") tables and loans the total estimated interest amount to the subscription from the service fee account. The subscriber-valid-business-months are all months that fall between the subscriber start date and the subscriber closed date, or the current date, whichever is earliest. The get schedule status program is used to determine the status of a single receipt or disbursement schedule. The program returns "active", "inactive", "post active" or "suspend" as the current status, based on the values of the request, start date, end date, next cycle ideal date and suspend days. The log SX change creates an SX record for a specified disbursement schedule if the payee requires notification.

Although the invention is described herein with reference to the preferred embodiment, one skilled in the art will readily appreciate that other applications may be substituted for those set forth herein without departing from the spirit and scope of the present invention. Further, for example, processes described in conjunction with FIGS. 7-12 are intended as representative and not limiting, as they may be implemented in additional ways and using different terminology, all within the scope of the present invention. Accordingly, the invention should only be limited by the claims included below.

What is claimed is:

1. A bill-paying service method, comprising:
   enrolling a subscriber who is a debtor to a first creditor and who has authorized debits to be taken from a designated account, the designated account periodically receiving a payroll deposit on a first regular schedule that is over time in excess of a minimum payment on a first debt owed by the debtor to the first creditor;
   periodically debiting the designated account by a computer processor and using any funds obtained to credit a custody account;
   paying by a computer processor the first creditor on behalf of the debtor from the custody account, wherein the paying occurs on a second regular schedule that differs from the first regular schedule, and wherein the paying is in an amount calculated for an accelerated repayment of the first debt;
   providing a bill paying service mechanism configured to determine an amount of funds to be paid to a second creditor from the custody account to pay a second debt owed the second creditor by the debtor;
   determining by a computer processor included in the bill paying service mechanism an amount of funds to be paid to the second creditor from the custody account to pay a second debt owed the second creditor by the debtor;
   paying by a computer processor the second creditor on behalf of the debtor from the custody account; and
   determining by a computer processor included in the bill paying service mechanism an extra payment to be made to the first creditor after paying the second creditor, the extra payment calculated to provide at least a portion of the accelerated repayment of the first debt.

2. The method as in claim 1 wherein periodically debiting the designated account coincides with the first regular schedule.

3. The method as in claim 1 further comprising charging a service fee to the subscriber by debiting the custody account.

4. The method as in claim 1 wherein the periodically debiting and the paying the first creditor each are implemented by a series of transmissions of ACH-files to an originating depository financial institution (ODFI) that has access to the designated account and the custody account, and that can forward funds to the first creditor.

5. The method as in claim 1 wherein a temporal difference between the first and second regular schedules provides at least partially for the accelerated repayment.

6. The method as in claim 1 further comprising reporting to the subscriber an adjusted credit term on the first debt.

7. The method as in claim 1 wherein the periodically debiting the designated account comprises debiting the designated account over a designated period of time in an amount that is at least as much as the sum of the first debt and the second debt.

8. The method as in claim 1 wherein the first debt comprises an interest-bearing debt and the second debt comprises a non-interest-bearing debt.

9. The method as in claim 1 wherein the designated account is adapted to periodically receive a second payroll deposit on a third regular schedule.

10. A bill paying system, comprising:
a computer programmed to perform designated functions with respect to:
a designated deposit account (DDA) belonging to a debtor, the DDA being periodically credited with a first credit on a first regular credit schedule;
a custody account, the custody account receiving funds from the DDA on a first funds transfer schedule;
a first creditor account belonging to a first creditor of the debtor; and
a second creditor account belonging to a second creditor of the debtor;
wherein the computer is programmed to determine an amount of funds comprising a first portion of the first credit to be transferred from the custody account to the first creditor account to provide an accelerated repayment of a first debt owed the first creditor by the debtor;
wherein the computer is further programmed to initiate a transfer of funds comprising a second portion of the first credit from the custody account to the second creditor account to pay a second debt owed the second creditor by the debtor; and
wherein the computer is further programmed to calculate an extra payment to be made to the first creditor after paying the second creditor, the extra payment calculated to provide at least a portion of the accelerated repayment of the first debt.

11. The bill paying system as in claim 10 wherein the DDA is periodically credited with a second credit on a second regular credit schedule.

12. The bill paying system as in claim 11 wherein at least one of the first and second credits comprises a direct deposit of a debtor paycheck.

13. The bill paying system as in claim 10 wherein the first debt comprises an interest-bearing debt and the second debt comprises a non-interest-bearing debt.

14. The bill paying system as in claim 10 wherein the computer is further programmed to report to the debtor:
the transfer of funds from the custody account to the first creditor account; and
an adjusted credit term on the first debt.

15. The bill paying system as in claim 10, wherein the computer is further programmed to interact with an originating depository financial institution (ODFI), the ODFI effectuating the transfer of funds between the DDA, the custody account and the first creditor account.

16. The bill paying system as in claim 10 wherein the computer is further programmed to perform a trust finder function.

17. The bill paying system as in claim 10 wherein the computer is further programmed to perform a campaign product tool.

* * * * *